United States Patent
Park et al.

(10) Patent No.: US 11,934,596 B2
(45) Date of Patent: Mar. 19, 2024

(54) ELECTRONIC DEVICE FOR DETECTING STYLUS PEN AND OPERATION METHOD THEREOF

(71) Applicant: SAMSUNG ELECTRONICS CO., LTD., Suwon-si (KR)

(72) Inventors: Changbyung Park, Suwon-si (KR); Byunghoon Kang, Suwon-si (KR); Yusheop Lee, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 17/698,217

(22) Filed: Mar. 18, 2022

(65) Prior Publication Data
US 2022/0206593 A1 Jun. 30, 2022

Related U.S. Application Data

(63) Continuation of application No. PCT/KR2020/012891, filed on Sep. 23, 2020.

(30) Foreign Application Priority Data

Sep. 23, 2019 (KR) .................. 10-2019-0117101

(51) Int. Cl.
*G06F 3/038* (2013.01)
*G06F 3/0354* (2013.01)
(Continued)

(52) U.S. Cl.
CPC .......... *G06F 3/038* (2013.01); *G06F 3/03545* (2013.01); *H02J 50/12* (2016.02); *H02J 50/90* (2016.02)

(58) Field of Classification Search
CPC .................................................. G06F 3/03545
See application file for complete search history.

(56) References Cited

U.S. PATENT DOCUMENTS 6,249,276 B1 * 6/2001 Ohno ...................... G06F 21/83
345/173
8,242,389 B2 * 8/2012 Chen ..................... G06F 1/1684
345/179

(Continued)

FOREIGN PATENT DOCUMENTS

JP 2009-276279 11/2009
KR 10-2015-0019227 2/2015
(Continued)

*Primary Examiner* — Michael J Jansen, II
(74) *Attorney, Agent, or Firm* — Nixon & Vanderhye P.C.

(57) ABSTRACT

An electronic device capable of sensing a contact by a peripheral device according to various embodiments may comprise: at least one coil configured to be linked to the peripheral device; and at least one processor configured to sense a contact by the peripheral device. The at least one processor may be configured to: detect a first reception signal from the at least one coil during a first period; apply a first transmission signal to the at least one coil during a second period after the passage of the first period; detect a second reception signal from the at least one coil during a third period after the passage of the second period; and check whether or not the peripheral device has been inserted in the electronic device based on the first reception signal and the second reception signal, wherein the first reception signal is not generated by the peripheral device, and the second reception signal is generated in response to the reception, by the peripheral device, of the first transmission signal.

13 Claims, 14 Drawing Sheets

(51) Int. Cl.
  *H02J 50/12* (2016.01)
  *H02J 50/90* (2016.01)

(56) References Cited

U.S. PATENT DOCUMENTS

| | | | | |
|---|---|---|---|---|
| 8,624,635 B2* | 1/2014 | Chang | ................ | H03M 1/1245 |
| | | | | 327/341 |
| 8,736,573 B2* | 5/2014 | Byun | ................ | G06F 3/045 |
| | | | | 345/174 |
| 9,125,160 B2* | 9/2015 | Lee | ................ | H04W 52/0277 |
| 9,459,710 B1* | 10/2016 | Brand | ................ | H02J 7/0044 |
| 9,897,682 B2* | 2/2018 | Altman | ................ | G06F 3/03545 |
| 10,198,124 B2* | 2/2019 | Lee | ................ | G06F 3/04182 |
| 10,516,394 B2* | 12/2019 | Kántor | ................ | H01F 27/36 |
| 10,613,155 B2* | 4/2020 | Wu | ................ | G01R 31/2829 |
| 11,079,865 B2* | 8/2021 | Kobori | ................ | G06F 3/03545 |
| 11,429,207 B2* | 8/2022 | Ninomiya | ................ | G06F 3/04162 |
| 11,481,060 B2* | 10/2022 | Bagheri | ................ | G06F 3/0414 |
| 2005/0166076 A1* | 7/2005 | Truong | ................ | G06F 1/3262 |
| | | | | 713/320 |
| 2006/0256097 A1* | 11/2006 | Oliver | ................ | G06F 3/03545 |
| | | | | 345/179 |
| 2008/0055279 A1* | 3/2008 | Osada | ................ | G06F 3/03545 |
| | | | | 345/179 |
| 2009/0114458 A1* | 5/2009 | Chen | ................ | G06F 1/1626 |
| | | | | 178/19.01 |
| 2010/0170726 A1* | 7/2010 | Yeh | ................ | G06F 3/03545 |
| | | | | 178/19.03 |
| 2012/0331546 A1 | 12/2012 | Falkenburg et al. | | |
| 2013/0106723 A1* | 5/2013 | Bakken | ................ | G06F 3/03545 |
| | | | | 345/173 |
| 2013/0207893 A1* | 8/2013 | Liu | ................ | H02J 50/90 |
| | | | | 345/157 |
| 2014/0113689 A1* | 4/2014 | Lee | ................ | H01M 10/44 |
| | | | | 455/573 |
| 2014/0293748 A1* | 10/2014 | Altman | ................ | G01S 3/8083 |
| | | | | 367/127 |
| 2015/0205382 A1* | 7/2015 | Lin | ................ | G06F 3/0383 |
| | | | | 345/179 |
| 2016/0077843 A1* | 3/2016 | Jakoboski | ................ | G06F 13/102 |
| | | | | 710/8 |
| 2016/0204642 A1 | 7/2016 | Oh et al. | | |
| 2016/0313814 A1* | 10/2016 | Jacobs | ................ | G06F 21/32 |
| 2017/0115755 A1* | 4/2017 | Jung | ................ | A61B 5/0205 |
| 2017/0302273 A1* | 10/2017 | Kántor | ................ | H01F 27/366 |
| 2017/0371434 A1* | 12/2017 | Kobori | ................ | G06F 3/046 |
| 2018/0314349 A1* | 11/2018 | Jiang | ................ | G06F 3/03545 |

FOREIGN PATENT DOCUMENTS

| | | |
|---|---|---|
| KR | 10-1760750 | 7/2017 |
| KR | 10-2018-0001454 | 1/2018 |

* cited by examiner

ELECTRONIC DEVICE FOR DETECTING STYLUS PEN AND OPERATION METHOD THEREOF

CROSS-REFERENCE TO RELATED APPLICATIONS

This application is a continuation of International Application No. PCT/KR2020/012891 designating the United States, filed on Sep. 23, 2020, in the Korean Intellectual Property Receiving Office and claiming priority to Korean Patent Application No. 10-2019-0117101, filed on Sep. 23, 2019, in the Korean Intellectual Property Office, the disclosures of which are incorporated by reference herein in their entireties.

BACKGROUND

Field

The disclosure relates to an electronic device for detecting a stylus pen and a method of operating the electronic device.

Description of Related Art

Electronic devices have been developed to receive various inputs from a user through a specified input device (e.g., a stylus pen) connected to the electronic devices through wireless communication. An electronic device may identify a position on the electronic device, designated by an input device having a pen function (which may be referred to as a "stylus pen" for convenience of description in the present disclosure), and perform a function corresponding to the position.

The electronic device may detect a magnetic field generated from the stylus pen by electromagnetic resonance (hereinafter, referred to as EMR). The electronic device may identify the position of the stylus pen based on an induced electromotive force generated by a magnetic field for each channel.

The stylus pen may be connected to the electronic device through short-range communication (e.g., Bluetooth low energy (BLE)). The stylus pen may, for example, transmit information about a pressed state of a button disposed on a housing of the stylus pen to the electronic device through short-distance communication, and the electronic device may perform a specified operation based on the received information.

When the stylus pen is inserted into the electronic device, the electronic device may charge the stylus pen, and when the stylus pen is withdrawn, the electronic device may perform an operation based on a signal (e.g., an EMR signal and/or a BLE signal) from the stylus pen. Accordingly, the electronic device needs to accurately identify whether the stylus pen has been inserted. The accuracy of determining whether the stylus pen has been inserted may be decreased due to ambient noise.

SUMMARY

Embodiments of the disclosure provide an electronic device and a method of operating the same in which it may be identified whether a stylus pen has been inserted by suppressing measured noise after the noise is measured.

According to various example embodiments, an electronic device for detecting a contact by a peripheral device may include: at least one coil configured to interwork with the peripheral device, and at least one processor configured to detect a contact by the peripheral device. The at least one processor may be configured to: detect a first reception signal from the at least one coil during a first period, control application of a first transmission signal to the at least one coil during a second period based on the first period elapsing, detect a second reception signal from the at least one coil during a third period based on the second period elapsing, and identify whether the peripheral device is inserted into the electronic device, based on the first reception signal and the second reception signal. The first reception signal may not be generated by the peripheral device, and the second reception signal may be generated in response to reception of the first transmission signal at the peripheral device.

According to various example embodiments, an electronic device for detecting a contact by a peripheral device may include at least one coil configured to interwork with the peripheral device, and at least one processor configured to detect a contact by the peripheral device. The at least one processor may be configured to: identify whether wireless charging is started from a wireless power supply by the electronic device, based on the wireless charging not being started, identify whether the peripheral device is inserted into the electronic device, based on a first method, and based on the wireless charging being started, identify whether the peripheral device is inserted into the electronic device, based on a second method different from the first method.

According to various example embodiments, an electronic device for detecting a contact made of a peripheral device may include at least one coil configured to interwork with the peripheral device, and at least one processor configured to detect a contact by the peripheral device. The at least one processor may be configured to: control application of a first transmission signal to the at least one coil during a first period, detect a first reception signal from the at least one coil during a second period based on the first period elapsing, detect a second reception signal from the at least one coil during a third period based on the second period elapsing, and identify whether the peripheral device is inserted into the electronic device, based on the first reception signal and the second reception signal. The first reception signal may not be generated by the peripheral device, and the second reception signal may be generated in response to reception of the first transmission signal at the peripheral device.

According to various example embodiments, an electronic device for identifying whether a stylus pen has been inserted by suppressing measured noise after the noise is measured, and a method of operating the electronic device may be provided. Accordingly, it may be identified accurately whether the stylus pen has been inserted in a noise environment such as a wireless charging environment.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, the same or similar reference numerals may be used to denote the same or similar components.

DETAILED DESCRIPTION

Figure 1:
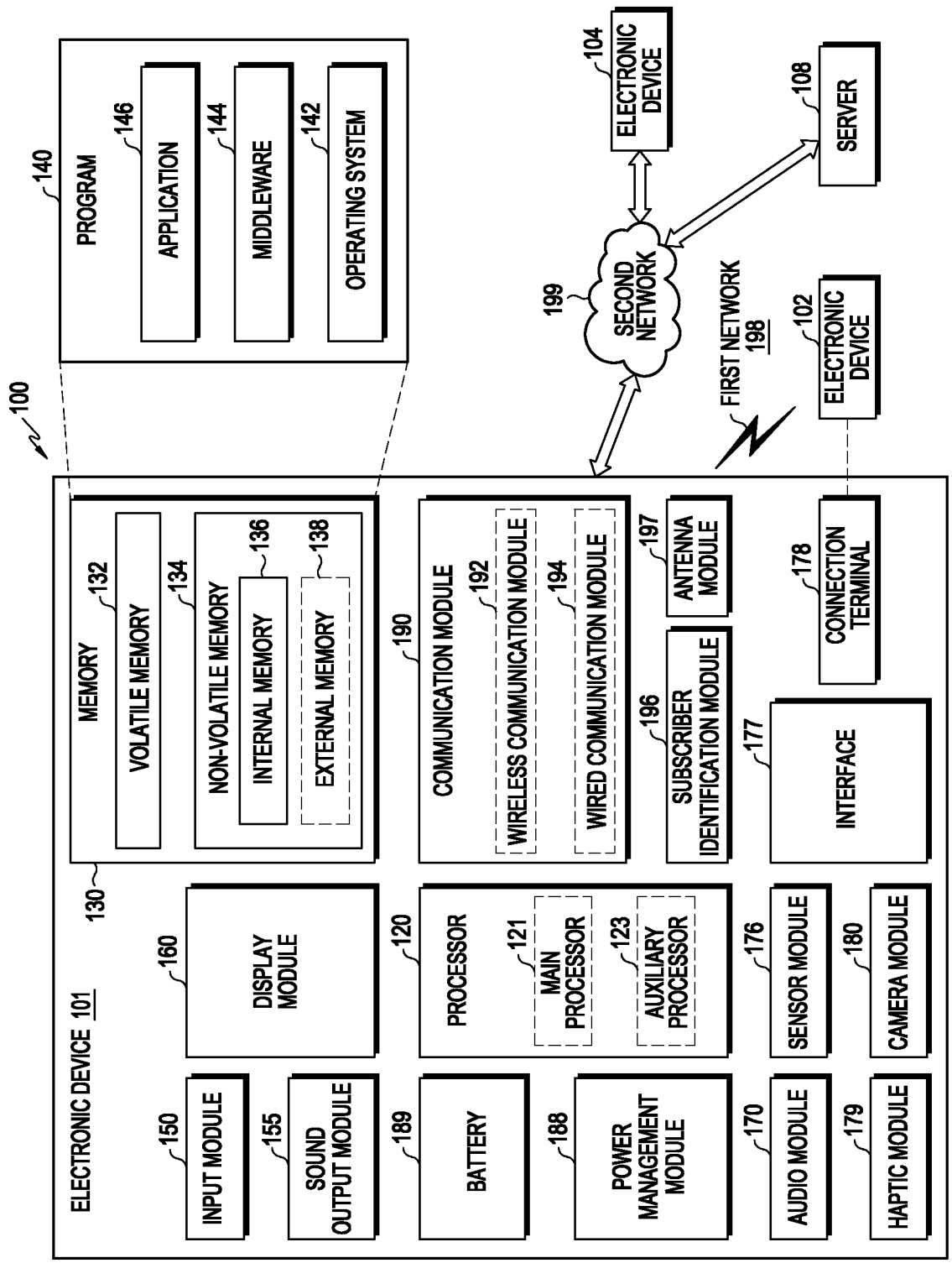
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
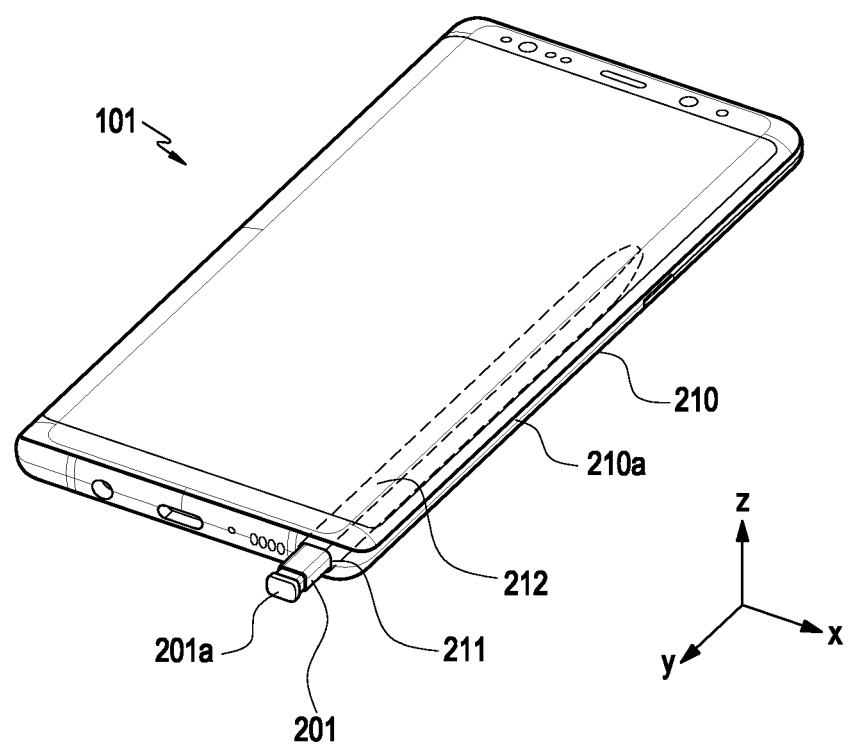
FIG. 2 is a front perspective view illustrating an electronic device including a stylus pen according to various embodiments.

FIG. 2 is a front perspective view illustrating the electronic device 101 including a stylus pen 201 (e.g., the electronic device 102 of FIG. 1) according to various embodiments. According to various embodiments, the stylus pen 201 may correspond to the input device 150 of FIG. 1, instead of the electronic device 101 of FIG. 1.

Referring to FIG. 2, the electronic device 101 according to various embodiments may include the configuration illustrated in FIG. 1, and a structure into which the stylus pen 201 may be inserted. The electronic device 101 may include a housing 210 and a hole 211 in a part of the housing 210, for example, a part of a side surface 210a. The electronic device 101 may include a first internal space 212 that is an accommodation space connected to the hole 211, and the stylus pen 201 may be inserted into the first internal space 212. According to the illustrated embodiment, the stylus pen 201 may include a first button 201a which may be pressed at one end thereof to facilitate withdrawal of the stylus pen 201 out of the first internal space 212 of the electronic device 101. When the first button 201a is pressed, the stylus pen 201 may be detached from the first internal space 212 under the action of a repulsion mechanism configured in association with the first button 201a (e.g., a repulsion mechanism of at least one elastic member (e.g., a spring)).

Figure 3A:
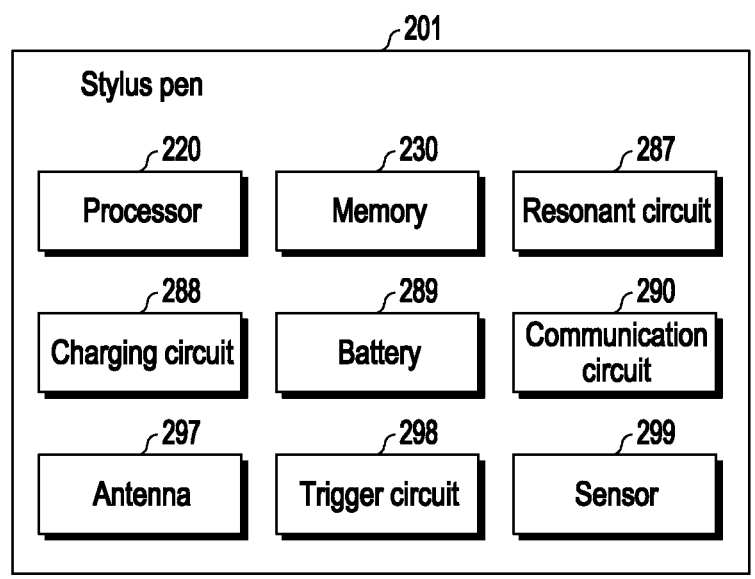
FIG. 3A is a block diagram illustrating an example configuration of a stylus pen according to various embodiments.

FIG. 3A is a block diagram illustrating an example configuration of a stylus pen (e.g., the stylus pen 201 of FIG. 2) according to various embodiments.

Referring to FIG. 3A, the stylus pen 201 according to an embodiment may include a processor (e.g., including processing circuitry) 220, a memory 230, a resonant circuit 287, a charging circuit 288, a battery 289, a communication circuit 290, an antenna 297, a trigger circuit 298, and/or a sensor 299. In various embodiments, the processor 220, at least a part of the resonant circuit 287, and/or at least a part of the communication circuit 290 in the stylus pen 201 may be configured on a printed circuit board or in the form of a chip. The processor 220, the resonant circuit 287, and/or the communication circuit 290 may be electrically coupled to the memory 230, the charging circuit 288, the battery 289, the antenna 297, the trigger circuit 298, and/or the sensor 299.

The processor 220 according to various embodiments may include various processing circuitry, such as, for example, and without limitation, a generic processor configured to implement a customized hardware module or software (e.g., an application program). The processor 220 may include a hardware component (function) or software element (program) which includes at least one of various sensors, a data measurement module, an input/output interface, a module for managing the state or environment of the stylus pen 201, or a communication module in the stylus pen 201. The processor 220 may include, for example, one or a combination of two or more of hardware, software, and firmware. According to an embodiment, the processor 220 may be configured to transmit information indicating a pressed state of a button (e.g., a button 337), sensing information obtained by the sensor 299, and/or information (e.g., information related to the position of the stylus pen 201) to the electronic device 101 through the communication circuit 290.

The resonant circuit 287 according to various embodiments may resonate based on an electromagnetic field signal generated from a digitizer (e.g., the display device 160) of the electronic device 101, and radiate an electromagnetic resonance (EMR) input signal (or a magnetic field) by resonance. The electronic device 101 may identify the position of the stylus pen 201 on the electronic device 101 using the EMR input signal. For example, the electronic device 101 may identify the position of the stylus pen 201 based on the magnitude of an induced electromotive force (e.g., output current) generated by the EMR input signal in each of a plurality of channels (e.g., a plurality of loop coils) in the digitizer. While it has been described above that the electronic device 101 and the stylus pen 201 operate based on EMR, this is merely an example, and the electronic device 101 may generate an electric field-based signal based on electrically coupled resonance (ECR). The resonant circuit of the stylus pen 201 may be resonated by an electric field. The electronic device 101 may identify a potential in the plurality of channels (e.g., electrodes) due to resonance in the stylus pen 201 and identify the position of the stylus pen 201 based on the potential. Those skilled in the art will understand that the stylus pen 201 may be implemented in an active electrostatic (AES) method, and there is no limitation in the implementation type of the stylus pen 201. Further, the electronic device 101 may detect the stylus pen 201 based on a change in capacitance (self-capacitance or mutual capacitance) associated with at least one electrode of a touch panel. In this case, the stylus pen 201 may not include the resonant circuit. In the present disclosure, "panel" or "sensing panel" may be used as a term encompassing a digitizer and a touch screen panel (TSP).

The memory 230 according to various embodiments may store information related to the operation of the stylus pen 201. For example, the information may include information for communication with the electronic device 101 and frequency information related to an input operation of the stylus pen 201. In addition, the memory 230 may store a program (or application, algorithm, or processing loop) for calculating position information (e.g., coordinate information and/or displacement information) about the stylus pen 201 from sensing data of the sensor 299. The memory 230 may store a communication stack of the communication circuit 290. Depending on the implementation, the communication circuit 290 and/or the processor 220 may include a dedicated memory.

The resonant circuit 287 according to various embodiments may include a coil (or inductor) and/or a capacitor. The resonant circuit 287 may resonate based on an input electric field and/or magnetic field (e.g., an electric field and/or magnetic field generated by the digitizer of the electronic device 101). When the stylus pen 201 transmits a signal by EMR, the stylus pen 201 may generate a signal including a resonance frequency based on an electromagnetic field generated from an inductive panel of the electronic device 101. When the stylus pen 201 transmits a signal by AES, the stylus pen 201 may generate a signal by capacitive coupling with the electronic device 101. When the stylus pen 201 transmits a signal by ECR, the stylus pen 201 may generate a signal including a resonance frequency based on an electric field generated from a capacitive device of the electronic device. According to an embodiment, the resonant circuit 287 may be used to change the strength or frequency of the electromagnetic field according to a user's manipulation state. For example, the resonant circuit 287 may provide various frequencies for recognizing a hovering input, a drawing input, a button input, or an erasing input. For example, the resonant circuit 287 may provide various resonance frequencies according to a connection combination of a plurality of capacitors, or may provide various resonance frequencies based on a variable inductor and/or a variable capacitor.

When the charging circuit 288 according to various embodiments is coupled to the resonant circuit 287 based on a switching circuit, the charging circuit 288 may rectify a resonance signal generated from the resonant circuit 287 into a DC signal and provide the DC signal to the battery 289. According to an embodiment, the stylus pen 201 may identify whether it has been inserted into the electronic device 101 using the voltage level of the DC signal detected by the charging circuit 288. Alternatively, the stylus pen 201 may identify whether it has been inserted by checking a pattern corresponding to a signal identified by the charging circuit 288.

The battery 289 according to various embodiments may be configured to store power required for the operation of the stylus pen 201. The battery 289 may include, for example, a lithium-ion battery or a capacitor, and may be rechargeable or replaceable. According to an embodiment, the battery 289 may be charged with power (e.g., a DC signal (DC power)) received from the charging circuit 288.

The communication circuit 290 according to various embodiments may be configured to perform a wireless communication function between the stylus pen 201 and the communication module 190 of the electronic device 101. According to an embodiment, the communication circuit 290 may transmit state information, input information, and/or position-related information about the stylus pen 201 to the electronic device 101 by a short-range communication scheme. For example, the communication circuit 290 may transmit direction information (e.g., motion sensor data) about the stylus pen 201, obtained through the trigger circuit 298, voice information input through a microphone, or information about the remaining amount of the battery 289. For example, the communication circuit 290 may transmit sensing data obtained from the sensor 299 and/or information related to the position of the stylus pen 201 identified based on the sensing data to the electronic device 101. For example, the communication circuit 290 may transmit information about a state of a button (e.g., the button 337) included in the stylus pen 201 to the electronic device 101. For example, the short-range communication scheme may include, but not limited to, at least one of Bluetooth, BLE, NFC, Wi-Fi direct, or wireless LAN.

The antenna 297 according to various embodiments may be used to transmit or receive a signal or power to or from the outside (e.g., the electronic device 101). According to an embodiment, the stylus pen 201 may include a plurality of antennas 297 and select at least one antenna 297 suitable for a communication scheme from among the plurality of antennas 297. The communication circuit 290 may exchange signals or power with an external electronic device through the selected at least one antenna 297.

The trigger circuit 298 according to various embodiments may include at least one button or a sensor circuit. According to an embodiment, the processor 220 may identify the input method (e.g., touch or press) or type (e.g., EMR button or BLE button) of the button of the stylus pen 201. According to an embodiment, the sensor circuit may generate an electrical signal or data value corresponding to an internal operating state or external environmental state of the stylus pen 201. For example, the sensor circuit may include at least one of a motion sensor, a residual battery level sensor, a pressure sensor, an optical sensor, a temperature sensor, a geomagnetic sensor, or a biometric sensor. According to an embodiment, the trigger circuit 298 may transmit a trigger signal to the electronic device 101 using an input signal of the button or a signal through the sensor.

The sensor 299 according to various embodiments may include various sensors and/or sensing circuitry including, for example, and without limitation, an acceleration sensor, a gyro sensor, and/or a geomagnetic sensor. The acceleration sensor may sense information about a linear movement of the stylus pen 201. The gyro sensor may sense information related to rotation of the stylus pen 201. The geomagnetic sensor may sense information about an inclined state (e.g., orientation) of the stylus pen 201. The processor 220 may transmit information obtained from the sensor 299 to the electronic device 101 through the communication circuit 290. Alternatively, the processor 220 may transmit information related to the position of the stylus pen 201 (e.g., the coordinates and/or displacement of the stylus pen 201) to the electronic device 101 through the communication circuit 290, based on the information obtained from the sensor 299.

Figure 3B:
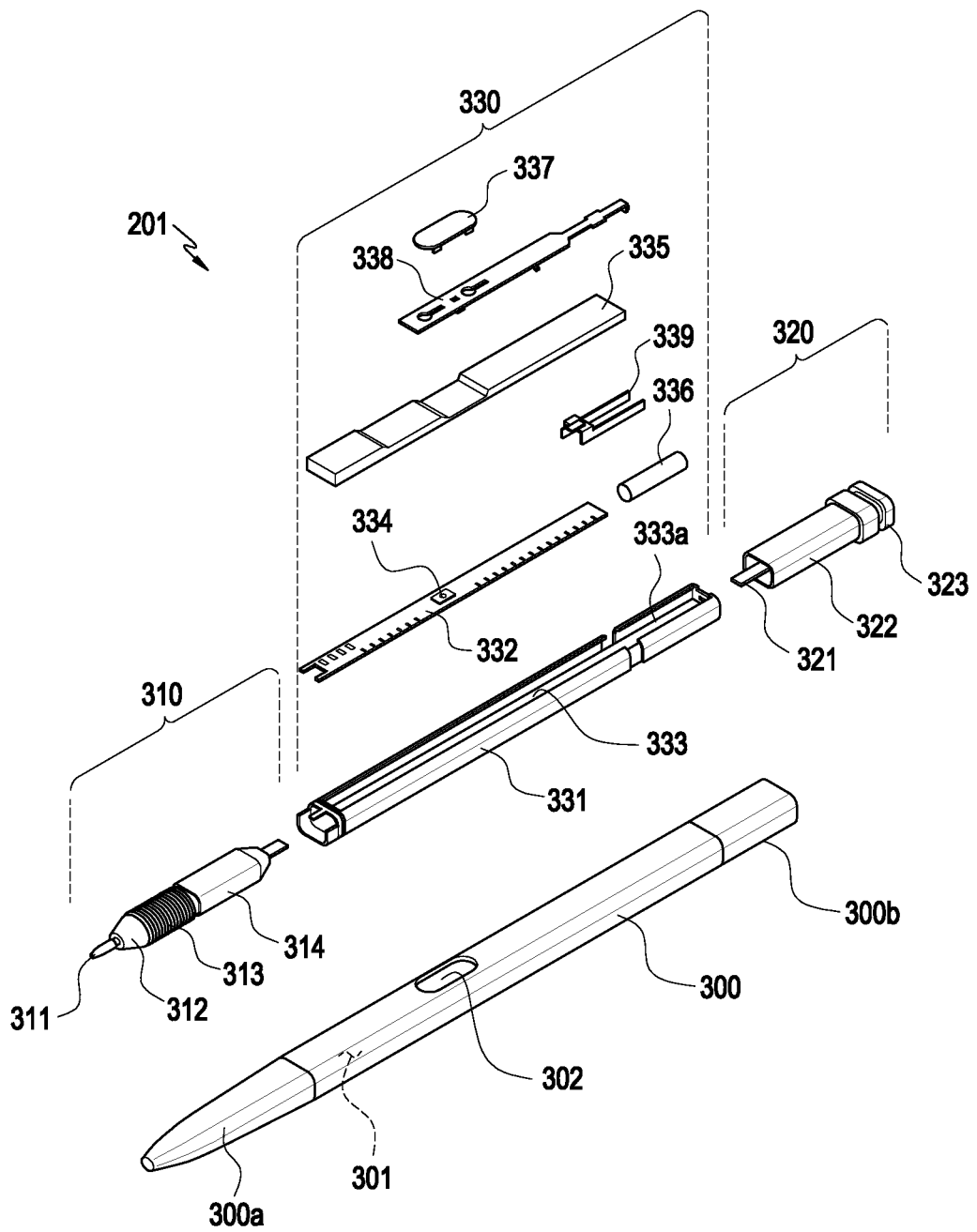
FIG. 3B is an exploded perspective view illustrating a stylus pen according to various embodiments.

FIG. 3B is an exploded perspective view illustrating a stylus pen (e.g., the stylus pen 201 of FIG. 2), according to various embodiments.

Referring to FIG. 3B, the stylus pen 201 may include a pen housing 300 forming the exterior of the stylus pen 201 and an inner assembly inside the pen housing 300. In the illustrated embodiment, the inner assembly may be inserted into the pen housing 300 by one assembly operation in a state in which multiple components mounted in the stylus pen 201 are coupled together.

The pen housing 300 may be elongated between a first end 300a and a second end 300b and include a second internal space 301 therein. The pen housing 300 may have an elliptical cross-section with a major axis and a minor axis, and may be formed in the shape of an elliptical column as a whole. The first internal space 212 of the electronic device 101 described above in FIG. 2 may also have an elliptical cross-section corresponding to the shape of the pen housing 300. According to various embodiments, at least a part of the pen housing 300 may include a synthetic resin (e.g., plastic) and/or a metallic material (e.g., aluminum). According to an embodiment, the first end 300a of the pen housing 300 may be formed of a synthetic resin material. Various other embodiments may be applied to the material of the pen housing 300.

The inner assembly may have an elongated shape corresponding to the shape of the pen housing 300. The inner assembly may be divided largely into three components along a length direction. For example, the inner assembly may include a coil unit 310 disposed at a position corresponding to the first end 300a of the pen housing 300, an ejection member 320 disposed at a position corresponding to the second end 300b of the pen housing 300, and a circuit board unit 330 disposed at a position corresponding to a body of the pen housing 300.

The coil unit 310 may include a pen tip 311 exposed to the outside of the first end 300a, when the inner assembly is completely inserted into the pen housing 300, a packing ring 312, a coil 313 wound a plurality of times, and/or a pen pressure sensing portion 314 for obtaining a pressure change according to pressing of the pen tip 311. The packing ring 312 may include epoxy, rubber, urethane, or silicon. The packing ring 312 may be provided for the purpose of waterproofing and dustproofing, and may protect the coil unit 310 and the circuit board unit 330 from immersion or dust. According to an embodiment, the coil 313 may form a resonance frequency in a configured frequency band (e.g., 500 kHz), and may be combined with at least one element (e.g., a capacitor) to adjust the resonance frequency formed by the coil 313 in a certain range.

The ejection member 320 may include a component for withdrawing the stylus pen 201 from the first internal space 212 of the electronic device (e.g., 101 of FIG. 2). According to an embodiment, the ejection member 320 may include a shaft 321, an ejection body 322 disposed around the shaft 321 and forming the overall exterior of the ejection member 320, and a button portion 323 (e.g., the first button 201a of FIG. 2). When the inner assembly is completely inserted into the pen housing 300, a part including the shaft 321 and the ejection body 322 may be surrounded by the second end 300b of the pen housing 300, and at least a part of the button portion 323 may be exposed to the outside of the second end 300b. A plurality of components which are not shown, for example, cam members or elastic members may be disposed in the ejection body 322 to form a push-pull structure. In an embodiment, the button portion 323 may be substantially coupled with the shaft 321 to make a linear reciprocating movement with respect to the ejection body 322. According to various embodiments, the button portion 323 may include a button having a locking structure so that a user may take out the stylus pen 201 using a fingernail. According to an embodiment, the stylus pen 201 may provide another input method by including a sensor for detecting a linear reciprocating movement of the shaft 321.

The circuit board unit 330 may include a printed circuit board 332, a base 331 surrounding at least one surface of the printed circuit board 332, and an antenna. According to an embodiment, a board mounting portion 333 on which the printed circuit board 332 is disposed may be formed on the top surface of the base 331, and the printed circuit board 332 may be mounted fixedly on the board mounting portion 333. According to an embodiment, the printed circuit board 332 may include a first surface and a second surface, a variable capacitor or a switch 334 coupled to the coil 313 may be disposed on the first surface, and, a charging circuit, a battery 336 or a communication circuit may be disposed on the second surface. According to an embodiment, the first surface and the second surface of the printed circuit board 332 may refer, for example, to different stacked surfaces in a top/down stack structure. According to an embodiment, the first surface and the second surface of the printed circuit board 332 may refer to different parts of the printed circuit board 332 disposed along a length direction. The printed circuit board 332 may be coated with a packing member 335. The battery 336 may include an electric double layered capacitor (EDLC). The charging circuit may be located between the coil 313 and the battery and include voltage detector circuitry and a rectifier. The battery 336 may not necessarily be disposed on the second surface of the printed circuit board 332. Various position may be available for the battery 336 according to various mounting structures of the circuit board 330, and the battery 336 may be disposed at a position different from that shown in the drawings.

The antenna may include an antenna structure 339 as in the example of FIG. 3B and/or an antenna embedded in the printed circuit board 332. According to various embodiments, the switch 334 may be provided on the printed circuit board 332. A second button 337 provided in the stylus pen 201 may be used to press the switch 334 and exposed to the outside through a side opening 302 of the pen housing 300. While supporting the second button 337, a support member 338 may provide an elastic restoring force to restore or maintain the second button 337 to or at a specific position, when no external force acts on the second button 337. The second button 337 may be implemented as, but not limited to, any one of a physical key, a touch key, a motion key, a pressure key, and a keyless one.

The circuit board unit 330 may include, for example, a packing ring such as an O-ring. According to an embodiment, O-rings formed of an elastic material may be disposed at both ends of the base 331 to form a sealing structure between the base 331 and the pen housing 300. In various embodiments, the support member 338 may be partially brought into close contact with the inner wall of the pen housing 300 around the side opening 302 to form a sealing structure. For example, a waterproof and dustproof structure similar to the packing ring 312 of the coil unit 310 may be included in at least one part of the circuit board unit 330.

The stylus pen 201 may include a battery mounting portion 333a on which the battery 336 is disposed, on the top surface of the base 331. The battery 336 which may be mounted on the battery mounting portion 333a may include, for example, a cylinder-type battery.

The stylus pen 201 may include a microphone (not shown) and/or a speaker. The microphone and/or the speaker may be directly coupled to the printed circuit board 332 or coupled to a separate flexible printed circuit board (FPCB) (not shown) coupled to the printed circuit board 332. According to various embodiments, the microphone and/or the speaker may be disposed at a position parallel to the second button 337 in the longitudinal direction of the stylus pen 301.

Figure 4:
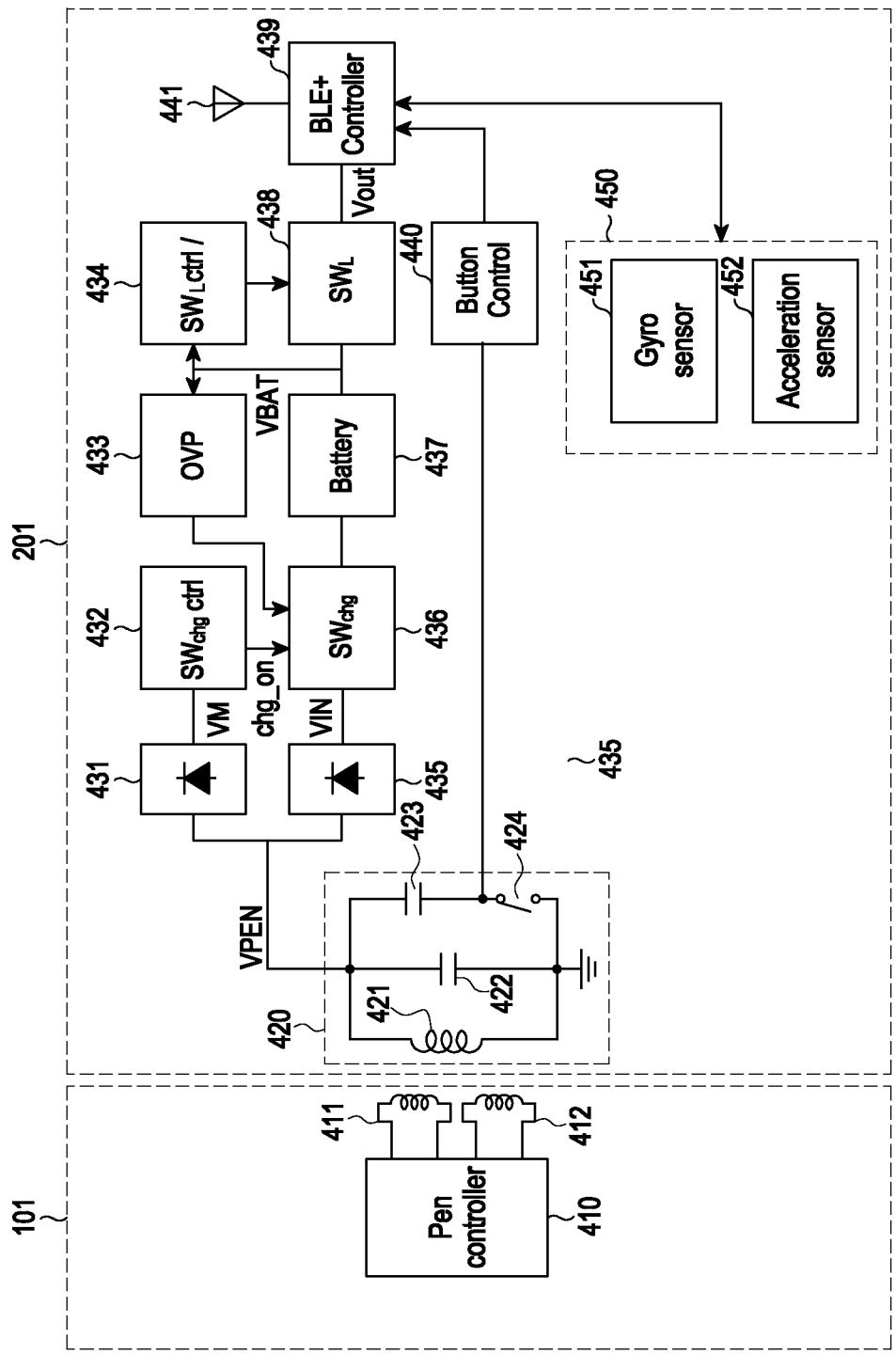
FIG. 4 is a block diagram illustrating example configurations of an electronic device and a stylus pen according to various embodiments.

FIG. 4 is a block diagram illustrating example configurations of an electronic device and a stylus pen according to various embodiments.

According to various embodiments, the electronic device 101 may include a pen controller 410. The pen controller 410 may include, for example, at least one amplifier coupled to at least one coil 411 and 412. The pen controller 410 may include the at least one coil 411 and 412 and supply charging power to the stylus pen 201 through the at least one coil 411 and 412. The at least one coil 411 and 412 may be disposed at a position physically adjacent to the coil 421 of the stylus pen 201, when the stylus pen 201 is inserted into an accommodation space of the electronic device 101. However, the position at which the at least one coil 411 and 412 is not limited. The insertion into the accommodation space is merely an example, and the electronic device 101 may include an area (or space) in which the stylus pen 201 may be mounted (or attached) in addition to the accommodation space. In this case, the stylus pen 201 may be detachably attached in the corresponding area (or space). Those skilled in the art will understand that the operation of the stylus pen 201 performed when the stylus pen 201 is positioned in the accommodation space may also be performed, when the stylus pen 201 is attached to the mounting area (or space) in an embodiment. At least some functions of the pen controller 410 may be performed by the processor 120, or the pen controller 410 and the processor 120 may be integrated to perform at least some functions of the pen controller 410. In the present disclosure, when it is said that the pen controller 410 performs a specific operation, this may refer, for example, to the specific operation being performed by the processor 120 or by a control circuit independent of the processor 120. The pen controller 410 may include a control circuit (e.g., a control circuit independent of the processor 120), an inverter, and/or an amplifier in addition to the at least one coil 411 and 412. As described above, the pen controller 410 may not include the control circuit. In this case, a signal for charging may be provided to the at least one coil 411 and 412 under the control of the processor 120. Alternatively, a sensing panel controller (e.g., a sensing panel controller 511 of FIG. 5) may provide a signal having a pattern through the at least one coil 411 and 412. The pattern, which is pre-shared with the stylus pen 201, may include, for example, a pattern for controlling the stylus pen 201 including a charging start indication pattern, a charging end indication pattern, and a detection pattern. While two coils 411 and 412 are shown in the drawing as providing a charging signal or a signal having a pattern for control, this is merely an example, and the number of the coils is not limited.

According to various embodiments, a resonant circuit 420 of the stylus pen 201 (e.g., the resonant circuit 287 of FIG. 3A) may include a coil 421, at least one capacitor 422 and 423, and/or a switch 424. When the switch 424 is in an off state, the coil 421 and the capacitor 422 may form the resonant circuit, and when the switch 424 is in an on state, the coil 421 and the capacitors 422 and 423 may form the resonant circuit. Accordingly, the resonance frequency of the resonant circuit 420 may be changed according to the on/off state of the switch 424. For example, the electronic device 101 may identify the on/off state of the switch 424 based on the frequency of a signal from the stylus pen 201. For example, when the button 337 of the stylus pen 201 is pressed/released, the switch 424 may be turned on/off, and the electronic device 101 may identify whether the button 337 of the stylus pen 201 has been pressed based on the frequency of a received signal, identified through the digitizer.

According to various embodiments, at least one rectifier 431 and 435 may rectify and output an AC waveform signal VPEN output from the resonant circuit 420. A charging switch controller ($SW_{chg}$ ctrl) 432 may receive a rectified signal VM output from the rectifier 431. Based on the rectified signal VM, the charging switch controller 432 may identify whether a signal generated from the resonant circuit 420 is a signal for charging or a signal for detecting a position. For example, the charging switch controller 432 may identify whether the signal generated from the resonant circuit 420 is a signal for charging or a signal for position detection based on, for example, the magnitude of the voltage of the rectified signal VM. Alternatively, the charging switch controller 432 may identify whether a signal having a charging start pattern is input based on the waveform of the rectified signal VM.

According to various embodiments, when identifying that the signal is for charging, the charging switch controller 432 may control a charging switch ($SW_{chg}$) 436 to be in an on state. When a signal having the charging start pattern is detected, the charging switch controller 432 may control the charging switch ($SW_{chg}$) 436 to be in the on state. The charging switch controller 432 may provide a charging start signal chg_on to the charging switch 436. In this case, a rectified signal VIN may be transmitted to a battery 437 (e.g., the battery 289 of FIG. 3A) through the charging switch 436. The battery 437 may be charged using the received rectified signal VIN. An over-voltage protection circuit (OVP) 433 may identify a battery voltage VBAT, and control the charging switch 436 to be in the off state, when the battery voltage exceeds an over-voltage threshold.

According to various embodiments, a load switch controller ($SW_L$ ctrl) 434 may control a load switch ($SW_L$) 438 to be in an on state, when identifying that the battery voltage exceeds an operating voltage threshold. When the load switch 438 is in the on state, power from the battery 437 may be transferred to a BLE communication circuit and controller (BLE+controller) 439 (e.g., the communication circuit 290 and the processor 220 of FIG. 3A). The BLE communication circuit and controller 439 may operate using the received power. When the distance between the stylus pen 201 and the electronic device 101 is greater than a threshold distance, a button control circuit 440 transmits information about an input of a button (e.g., the button 337) to the BLE communication circuit and controller 439. The BLE communication circuit and controller 439 may transmit the received information about the button input to the electronic device 101 through an antenna 441 (e.g., the antenna 297 of FIG. 3A). A sensor 450 (e.g., the sensor 299 of FIG. 3A) may include a gyro sensor 451 and/or an acceleration sensor 452. Sensing data obtained by the gyro sensor 451 and/or the acceleration sensor 452 may be transmitted to the BLE communication circuit and controller 439. The BLE communication circuit and controller 439 may transmit a communication signal including the received sensing data to the electronic device 101 through the antenna 441. The BLE communication circuit and controller 439 may identify information related to the position of the stylus pen 201 (e.g., the coordinates and/or displacement of the stylus pen 201), which is identified based on the received sensing data. The BLE communication circuit and controller 439 may transmit the identified information related to the position of the stylus pen 201 to the electronic device 101 through the antenna 441. According to various embodiments, when the stylus pen 201 is withdrawn from the electronic device 101, the BLE communication circuit and controller 439 may activate the acceleration sensor 452. When the button (e.g., the button 337) is pressed, the BLE communication circuit and controller 439 may activate the gyro sensor 451. The activation times are merely an example, and the activation time of each sensor is not limited. In addition, the sensor 450 may further include a geomagnetic sensor. When only the acceleration sensor 452 is activated, the stylus pen 201 may provide acceleration information measured by the acceleration sensor 452 to the electronic device 101, and the electronic device 101 may operate based on both of the position of the stylus pen 201, identified based on a pen signal, and the acceleration information about the stylus pen 201.

Figure 5:
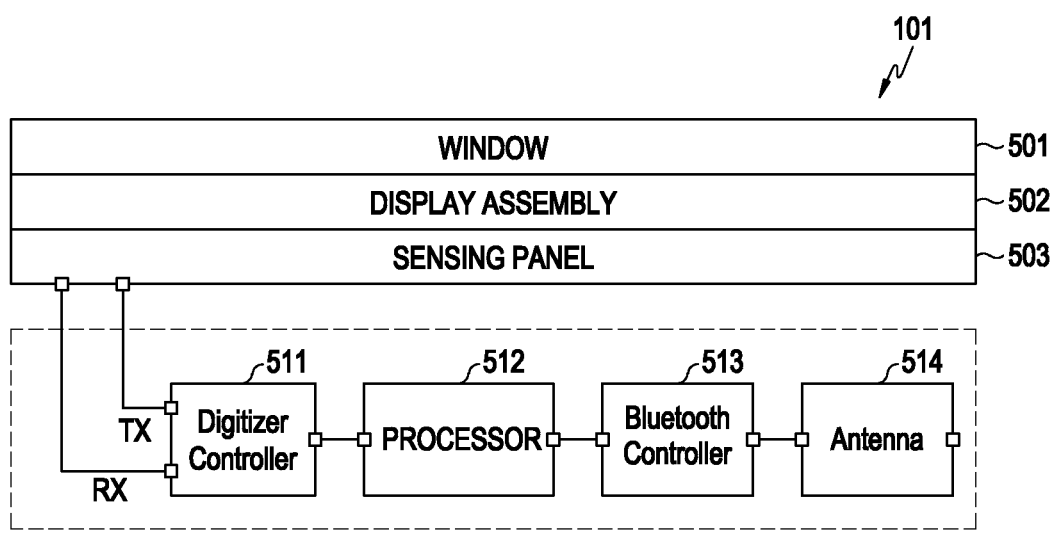
FIG. 5 is a diagram illustrating an example configuration of an electronic device according to various embodiments.

FIG. 5 is a diagram illustrating an example configuration of an electronic device according to various embodiments.

According to various embodiments, the electronic device 101 may include the sensing panel controller (e.g., digitizer controller) 511, a processor (e.g., including processing circuitry) 512 (e.g., the processor 120), a Bluetooth controller 513 (e.g., the communication module 190)), and/or an antenna 514. The electronic device 101 may include a sensing panel (e.g., digitizer) 503, a display assembly 502 disposed on the sensing panel 503, and/or a window 501 disposed on the display assembly 502. Depending on implementation, when the sensing panel 503 is implemented as a digitizer, a touch sensing panel may be further disposed on or under the sensing panel 503. The touch sensing panel may be located on the display assembly 502 according to implementation. The sensing panel 503 may be implemented as a digitizer and include a plurality of loop coils. According to various embodiments, when implemented as a digitizer, the sensing panel 503 may include an element (e.g., an amplifier) for applying an electrical signal (e.g., a transmission signal) to the loop coils. The sensing panel 503 may include an element (e.g., an amplifier, a capacitor, or an ADC) for processing a signal (e.g., an input signal) output from the loop coils. The sensing panel 503 may identify the position of the stylus pen 201 and output the identified position to the processor 120 based on the strength of a signal output from each of the loop coils (e.g., a digital value converted for each channel). Alternatively, depending on implementation, the processor 120 may identify the position of the stylus pen 201 based on the strength of a signal output from each of the loop coils (e.g., a digital value converted for each channel). For example, the sensing panel 503 may apply current to at least one of the loop coils, and the at least one coil may form a magnetic field. The stylus pen 201 may be resonated by a magnetic field formed around it, and a magnetic field may be formed from the stylus pen 201 by the resonance. Currents may be output from each of the loop coils by the magnetic field formed from the stylus pen 201. The electronic device 101 may identify the position of the stylus pen 201 based on the magnitude of current (e.g., a converted digital value) for each channel of the loop coils. To determine the position of the stylus pen 201 by the loop coils, coils extending in one axis (e.g., x-axis) direction and coils extending in another axis (e.g., y-axis) direction may be included. However, the arrangement of the loop coils is not limited. The sensing panel controller 511 may apply a transmission signal Tx to at least some of the plurality of loop coils of the sensing panel 503, and a loop coil receiving the transmission signal Tx may form a magnetic field. The sensing panel controller 511 may receive a reception signal Rx from at least some of the plurality of loop coils in a time-division manner. The sensing panel controller 511 may identify the position of the stylus pen 201 based on the reception signal Rx and transmit the position of the stylus pen 201 to the processor 512. For example, the strength of the reception signal Rx may be different for each of the plurality of loop coils (e.g., for each channel), and the position of the stylus pen 201 may be identified based on the strengths of reception signals. Further, the electronic device 101 may identify whether the button (e.g., the button 337) of the stylus pen 201 has been pressed based on the frequency of a received signal. For example, when the frequency of the received signal is a first frequency, the electronic device 101 may identify that the button of the stylus pen 201 has been pressed, and when the frequency of the received signal is a second frequency, the electronic device 101 may identify that the button of the stylus pen 201 has been released. Alternatively, when the sensing panel is implemented as a touch screen panel (TSP), the sensing panel 503 may identify the position of the stylus pen 200 based on an output signal from an electrode. The touch screen panel may be located on the display assembly 502. The touch screen panel may be configured in an in-cell structure in which a sensor electrode is located inside the display assembly 502, or an on-cell structure in which a sensor electrode is located on the display assembly 502. Alternatively, the electronic device 101 may detect the pen based on a change in the capacitance (mutual capacitance and/or self-capacitance) of a touch panel electrode. Hardware of the digitizer or the touch sensing panel, which is capable of sensing a pen signal from the stylus pen, may be referred to as the sensing panel 503. In various embodiments, the electronic device 101 may detect the stylus pen (or the position of the stylus pen) by recognizing an electrical signal generated from the pen based on the AES method.

The sensing panel controller 511 may identify whether the stylus pen 201 has been inserted into (or coupled with) the electronic device 101 based on a received signal, and transmit an identification result to the processor 512. Depending on implementation, the sensing panel controller 511 may be formed integrally with the sensing panel 503. In various embodiments, the pen controller 410 of FIG. 4 and the sensing panel controller 510 may be implemented as one IC. The processor 512 may transmit a signal for wireless charging based on whether the stylus pen has been inserted. The processor 512 may control the Bluetooth controller 513 based on whether the stylus pen has been inserted, so that when a wireless communication connection has not been established, wireless communication to the stylus pen 201 may be connected. In addition, when the stylus pen 201 has been mounted, charging capacity information may be transmitted to the electronic device 101 through, for example, wireless communication, and when the stylus pen 201 has been removed, information about a button press and sensor data may be transmitted to the electronic device 101. In addition, the processor 512 may control transmission of a charging signal and a control signal to the sensing panel controller 511 based on data received from the stylus pen 201. The processor 512 may identify a gesture based on the data received from the stylus pen 201 and perform an operation corresponding to the gesture. The processor 512 may transmit a function mapped to the gesture to an application. The Bluetooth controller 513 may transmit and receive information to and from the stylus pen 201 through the antenna 514. The display assembly 502 may include an element for displaying a screen. The window 501 may be formed of a transparent material for accommodating the display assembly 502.

Figure 6:
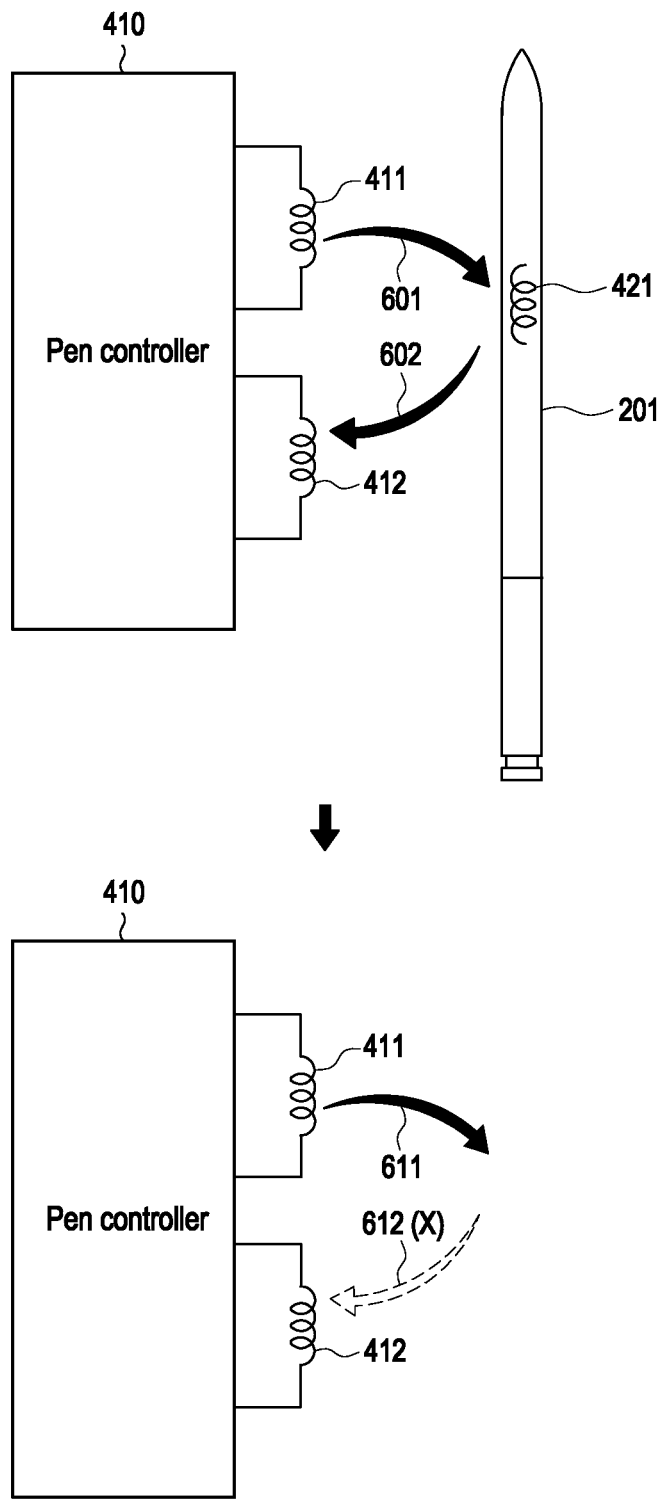
FIG. 6 is a diagram illustrating example identification of whether a stylus pen has been inserted according to various embodiments.
Figure 7:
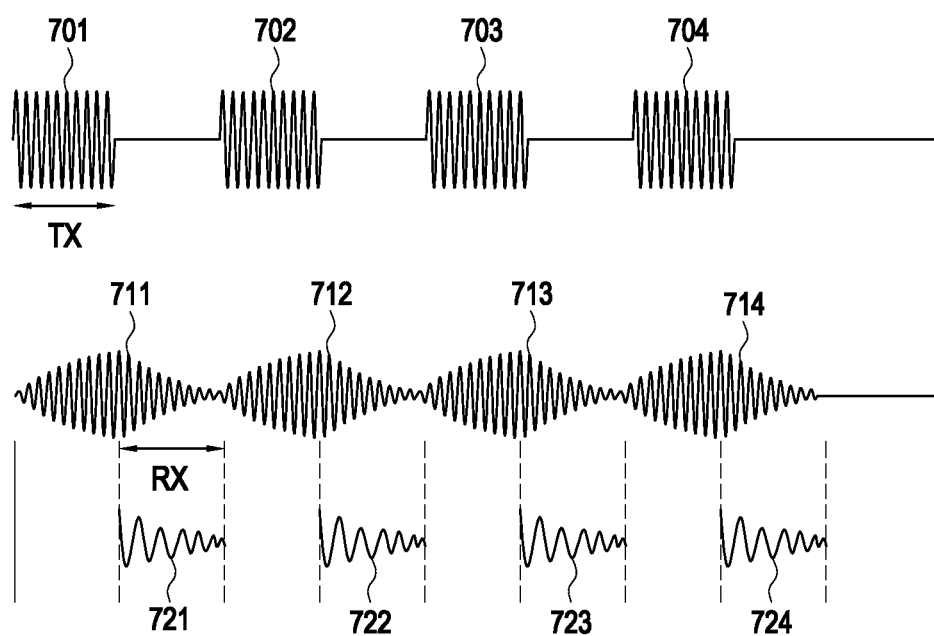
FIG. 7 is a graph illustrating a signal for detecting a stylus pen and a resonant signal formed within the stylus pen according to various embodiments.

FIG. 6 is a diagram illustrating example identification of whether a stylus pen has been inserted according to various embodiments. The embodiment of FIG. 6 will be described with reference to FIG. 7. FIG. 7 is a graph illustrating a signal for detecting a stylus pen and a resonance signal formed in the stylus pen according to various embodiments.

Referring to FIG. 6, the electronic device 101 (e.g., the processor 120 and/or the pen controller 410) may apply a signal for detecting the stylus pen 201 to the at least one coil 411 and 412. This signal may be referred to as a transmission signal. The at least one coil 411 and 412 may generate a magnetic field 601 based on the applied transmission signal. Although the magnetic field 601 is shown as formed toward the stylus pen 201 in FIG. 6, this is merely an example, and the orientation of the magnetic field 601 may be determined according to, for example, the shape and/or arrangement of the at least one coil 411 and 412. In some cases, the magnetic field 601 may be formed without any special orientation. The electronic device 101 may apply a transmission signal 701 for detecting the stylus pen 201 to the at least one coil 411 and 412 during a first period, for example, as illustrated in FIG. 7. The transmission signal 701 may be, but not limited to, for example, a square wave. The amplitude and/or frequency of the transmission signal 701 is not limited.

According to various embodiments, a resonance signal may be generated in the coil 421 within the stylus pen 201 based on the magnetic field 601 formed by the transmission signal 701. For example, as illustrated in FIG. 7, resonance signals 711, 712, 713, and 714 may be generated. The resonance signal 711 may be generated in the coil 421 of the stylus pen 201 based on a magnetic field generated by the transmission signal 701. Since the transmission signal 701 is generated only during the first period, it may be identified that the amplitude of the resonance signal 711 generated in the coil 421 also increases during the first period and then decreases. The resonance signals 711, 712, 713, and 714 may be generated by magnetic fields formed by transmission signals 701, 702, 703, and 704, respectively. Each of the resonance signals 711, 712, 713, and 714 may form an electromagnetic field 602, and the electromagnetic field 602 may be radiated spatially.

According to various embodiments, an induced electromotive force may be formed in the at least one coil 411 and 412 of the electronic device 101 by the electromagnetic field 602 formed by the resonance signal (e.g., the resonance signal 711). The induced electromotive force may be referred to as a reception signal. For example, the electronic device 101 may detect a reception signal 721 during a second period after the first period has elapsed. The reception signal 721 may have substantially the same frequency as the electromagnetic field 602 by the resonant signal 711, for example. The waveform (e.g., attenuated waveform) of the reception signal 721 may also be substantially the same as the waveform of the electromagnetic field 602 formed by the resonance signal 711. When the reception signal 721 is detected during the second period, the electronic device 101 may identify that the stylus pen 201 is detected. The electronic device 101 may identify that the stylus pen 201 has been inserted into the electronic device 101.

As illustrated in the lower part of FIG. 6, when the stylus pen 201 is drawn out, the electronic device 101 may apply a transmission signal to the at least one coil 411 and 412. A magnetic field 611 may be generated in the at least one coils 411 and 412. Since the stylus pen 201 is withdrawn, an electromagnetic field 612 may not be generated by the coil 421 of the stylus pen 201. Accordingly, during the second period after the lapse of the first period, the electronic device 101 may not detect a reception signal. When failing in detecting the reception signal, the electronic device 101 may identify that the stylus pen 201 has been withdrawn. In an ideal case without noise, the waveforms and/or frequencies of reception signals 721, 722, 723, and 724 of FIG. 7 may be substantially the same as the waveforms and/or frequencies of the electromagnetic fields formed by the resonant signals 711, 712, 713, and 714. If there is noise, the reception signal 721 which is an electromotive force induced by the electromagnetic field formed by the resonance signal 711 and the noise may be measured together.

Figure 8:
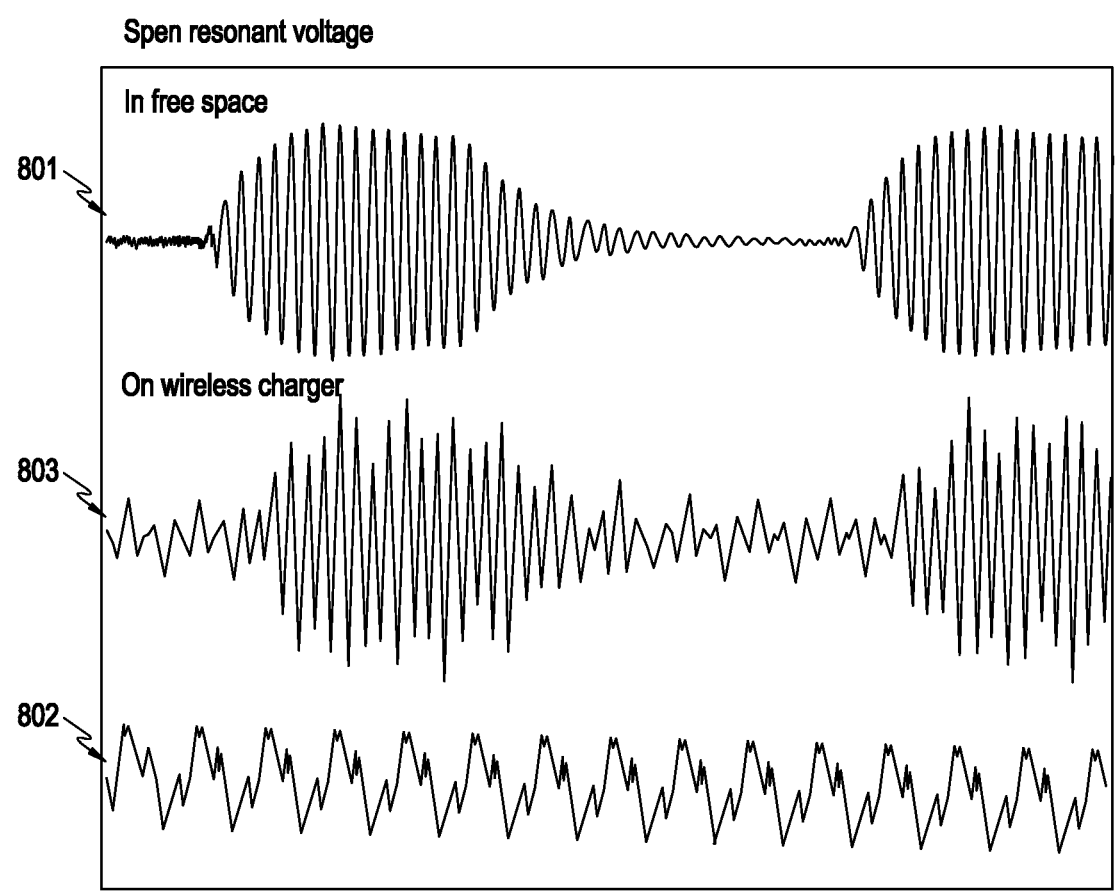
FIG. 8 is a diagram illustrating the waveforms of noise and a received signal according to various embodiments.

FIG. 8 is a graph illustrating example waveforms of noise and a reception signal according to various embodiments.

According to various embodiments, in a free space with relatively small noise, the electronic device 101 may detect a reception signal 801. For example, when the electronic device 101 performs wireless charging, it may receive an electromagnetic wave from a wireless charger. The electromagnetic wave from the wireless charger may be received by the electronic device 101 through a reception coil in a wireless charging module. However, electromagnetic waves from the wireless charger may also form an induced electromotive force in the at least one coil 411 and 412 for detecting the stylus pen. Electromagnetic waves from the wireless charger may be sensed through at least one coil 411 and 412, such as noise 802. Accordingly, the electronic device 101 may sense the reception signal 801 based on the resonance signal and the noise 802 together from the stylus pen 201, and sense a reception signal 803 with the noise. When a reception signal 803 is distorted, the accuracy of identifying whether the stylus pen 201 of the electronic device 101 has been inserted may be decreased.

Figure 9:
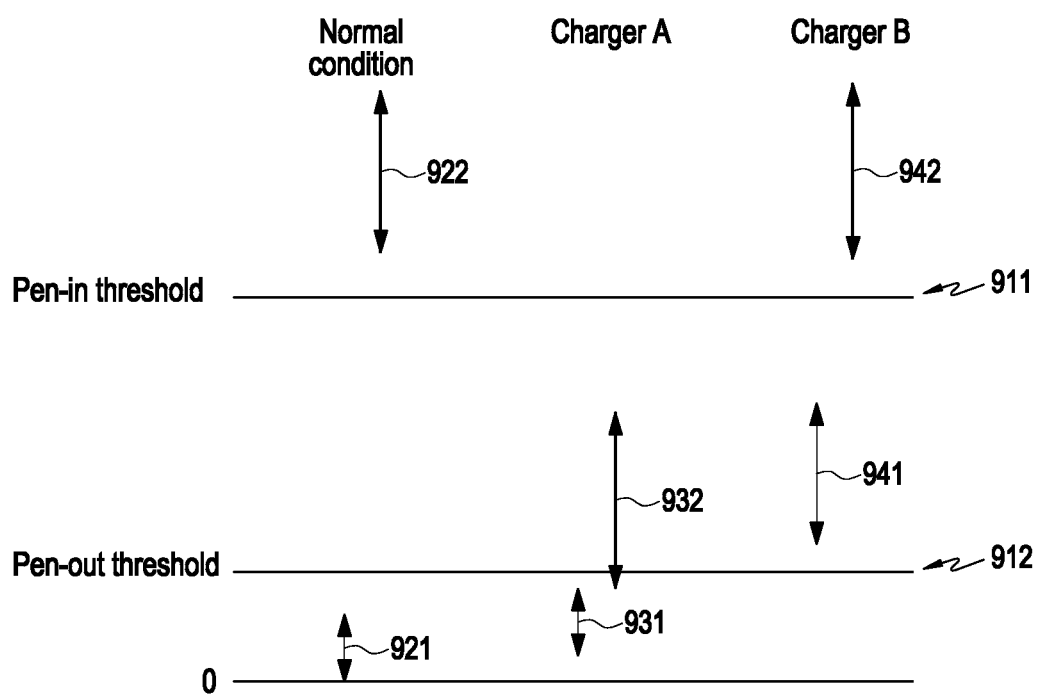
FIG. 9 is a graph illustrating the strengths of a reception signal under a normal condition and under a condition in which wireless charging is performed by a wireless charger according to various embodiments.

FIG. 9 is a graph illustrating example strengths of a reception signal under a normal condition and under a condition in which wireless charging is performed by a wireless charger according to various embodiments.

According to various embodiments, under the normal condition, when the stylus pen 201 is drawn out, the electronic device 101 may sense reception signals having strengths in a first range 921. Although the normal condition may refer to, for example, a case in which wireless charging is not performed, any case may be the normal condition as long as the strength of noise generated around and/or inside the electronic device 101 is less than a specified strength. For example, when wireless charging is performed, when the electronic device 101 forms an electromagnetic wave to wirelessly charge another electronic device, or when a plurality of types of wireless communications (e.g., an MRDC environment including an ENDC environment of 4G wireless communication and 5G wireless communication) are performed, noise with a strength exceeding the specified strength may occur. An environment (or mode) in which noise with a strength less than the specified strength is generated may be an example of the normal condition, not limiting the normal condition. When the stylus pen 201 is inserted under the normal condition, the electronic device 101 may sense reception signals having strengths in a second range 922. As described above, when the stylus pen 201 is inserted, the electronic device 101 may detect reception signals (e.g., the reception signals 721, 722, 723, and 724) by resonance signals (e.g., the electromagnetic field 602). Therefore, the reception signals of the second range 922 having strengths greater than those of the first range 921 may be sensed. When the measured strength of a reception signal is greater than or equal to a first threshold (e.g., a pen-in threshold) 911, the electronic device 101 may identify that the stylus pen 201 has been inserted. When the measured signal strength is less than or equal to a second threshold (e.g., a pen-out threshold) 912, the electronic device 101 may identify that the stylus pen 201 has been withdrawn. When identifying a value greater than the first threshold and less than the second threshold, the electronic device 101 may identify that a previous determination state continues.

The electronic device 101 may perform wireless charging by charger A. When the stylus pen 201 is withdrawn, the electronic device 101 may sense reception signals in a third range 931. When the stylus pen 201 is inserted, the electronic device 101 may sense reception signals in a fourth range 932. Since the values of the fourth range 932 are less than the first threshold 911, there is a possibility that the electronic device 101 identifies that the electronic device 101 is not being inserted. Alternatively, the electronic device 101 may perform wireless charging by charger B. When the stylus pen 201 is withdrawn, the electronic device 101 may sense reception signals in a fifth range 941. When the stylus pen 201 is inserted, the electronic device 101 may sense reception signals in a sixth range 942. Since the values of the fifth range 941 exceed the second threshold 912, there is a possibility that the electronic device 101 identifies that the electronic device 101 is not withdrawn. As described above, when wireless charging is performed, the accuracy of identifying whether the stylus pen 201 is inserted may be reduced. Since charger A and charger B may differ in at least one of a driving method, the configuration of a wireless charging coil, and a frequency band, noises caused by charger A and charger B may be different. Accordingly, it may be difficult to set a threshold suitable for all types of wireless chargers.

Figure 10:
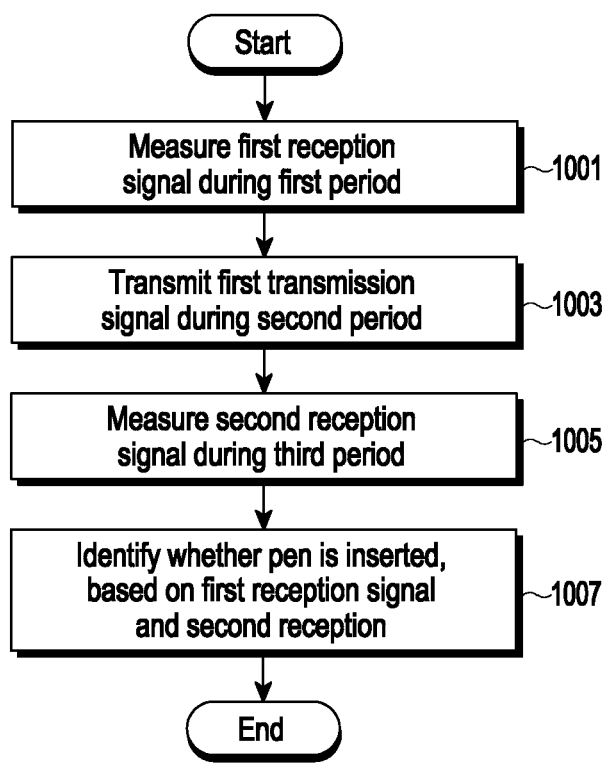
FIG. 10 is a flowchart illustrating an example method of operating an electronic device according to various embodiments.
Figure 11:
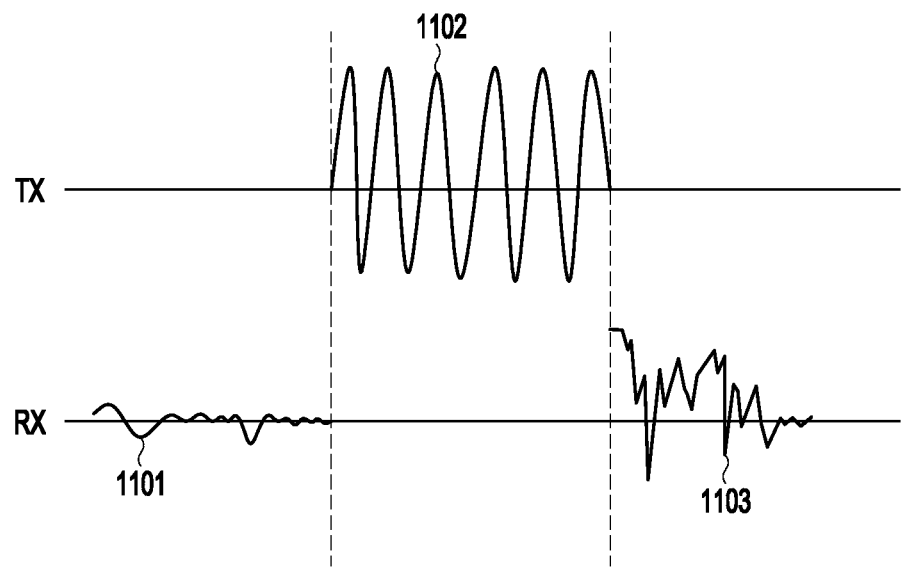
FIG. 11 is a graph illustrating a transmission signal and a received signal according to various embodiments.

FIG. 10 is a flowchart illustrating an example method of operating an electronic device according to various embodiments. The embodiment of FIG. 10 will be described with reference to FIG. 11. FIG. 11 is a graph illustrating an example transmission signal and an example reception signal according to various embodiments.

According to various embodiments, the electronic device 101 (e.g., the processor 120 and/or the pen controller 401) may measure a first reception signal during a first period in operation 1001. In an environment with noise, the electronic device 101 may measure a first reception signal 1101 as illustrated in FIG. 11. After not applying a transmission signal to the at least one coil 411 and 412 before the first period, the electronic device 101 may measure the first reception signal 1101 from the at least one coil 411 and 412 during the first period. In an ideal environment, the strength of the first reception signal 1101 may be 0 during the first period. However, in an environment with noise, the electronic device 101 may measure the first reception signal 1101 corresponding to the noise.

According to various embodiments, in operation 1003, the electronic device 101 may transmit a first transmission signal (e.g., a first transmission signal 1102 of FIG. 11) during a second period. For example, the electronic device 101 may apply the first transmission signal 1102 of FIG. 11 to the at least one coil 411 and 412 during the second period. Although the second period may be equal to the first period, the second period may be set to be different from the first period. In operation 1005, the electronic device 101 may measure a second reception signal (e.g., a second reception signal 1103 of FIG. 11) during a third period. Referring to FIG. 11, an electromotive force induced by a resonance signal generated from the stylus pen 201 in response to the first transmission signal 1102 and noise may be mixed in the second reception signal 1103. In operation 1007, the electronic device 101 may identify whether the stylus pen 201 has been inserted based on the first reception signal 1101 and the second reception signal 1103.

According to various embodiments, the electronic device 101 may subtract the first reception signal 1101 from the second reception signal 1103, and thus identify a reception signal in which noise is suppressed. The electronic device 101 may identify that the stylus pen 201 has been inserted, for example, when the strength of the reception signal in which noise is suppressed is equal to or greater than a first threshold (e.g., a pen insertion threshold). The electronic device 101 may identify that the stylus pen 201 has been withdrawn, for example, when the noise-suppressed reception signal is equal to or less than a second threshold (e.g., a pen withdrawal threshold). According to various embodiments, although the first threshold may be set to be greater than the second threshold, the first threshold may be set to be equal to the second threshold.

According to various embodiments, the electronic device 101 may subtract the first reception signal 1101 from the second reception signal 1103, and additionally perform filtering on the subtraction result. For example, the electronic device 101 may perform finite impulse response (FIR) filtering and/or infinite impulse response (IIR) filtering on the subtraction result. The electronic device 101 may identify whether the stylus pen 201 has been inserted based on a result of comparing a filtering result with at least one threshold (e.g., the pen insertion threshold and/or the pen withdrawal threshold).

According to various embodiments, the electronic device 101 may identify whether various types of peripheral devices as well as the stylus pen 201 has been inserted, mounted, and/or attached according to the method illustrated in FIG. 10. The electronic device 101 may detect any peripheral device without limitations, as far as the peripheral device may be inserted, mounted, and/or attached in the electronic device 101, such as the stylus pen 201, a wireless earphone, a game pad, a keyboard, a mouse, a speaker, a head-mounted device, a case, and a flip cover.

Figure 12:
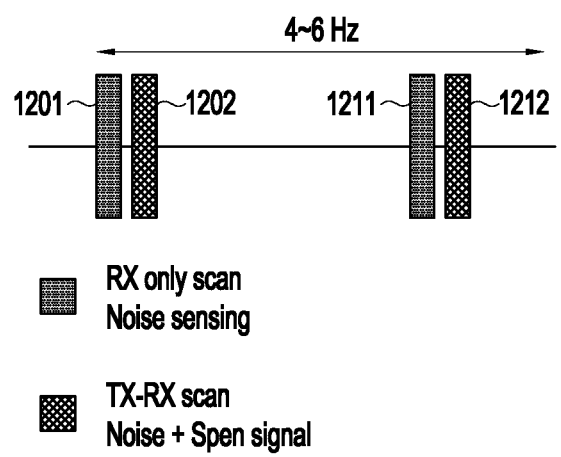
FIG. 12 is a diagram illustrating an example detection method of an electronic device according to various embodiments.

FIG. 12 is a diagram illustrating an example detection method of an electronic device according to various embodiments.

According to various embodiments, the electronic device 101 may detect only a reception signal at least once during a first detection period 1201 without applying a transmission signal. During a second detection period 1202, the electronic device 101 may alternate between application of a transmission signal and measurement of a reception signal at least once. The electronic device 101 may identify whether the stylus pen 201 has been inserted based on at least one reception signal measured during the second detection period 1202 and at least one reception signal measured during the first detection period 1201. When a specified scan period (e.g., a period corresponding to 4 to 6 Hz) elapses, the electronic device 101 may detect only a reception signal at least once without applying a transmission signal during a third detection period 1211. During a fourth detection period 1212, the electronic device 101 may alternate between application of a transmission signal and measurement of a reception signal at least once.

According to various embodiments, the electronic device 101 may alternate between application of a transmission signal and measurement of a reception signal, and then detect only the reception signal without applying the transmission signal. For example, during the first detection period 1201 in FIG. 12, the electronic device 101 may alternate between application of the transmission signal and measurement of the reception signal at least once. In addition, during the second detection period 1202, the electronic device 101 may detect only the reception signal at least once without applying the transmission signal. The electronic device 101 may identify whether the stylus pen 201 has been inserted based on at least one reception signal measured during the second detection period 1202 and at least one reception signal measured during the first detection period 1201.

Figure 13:
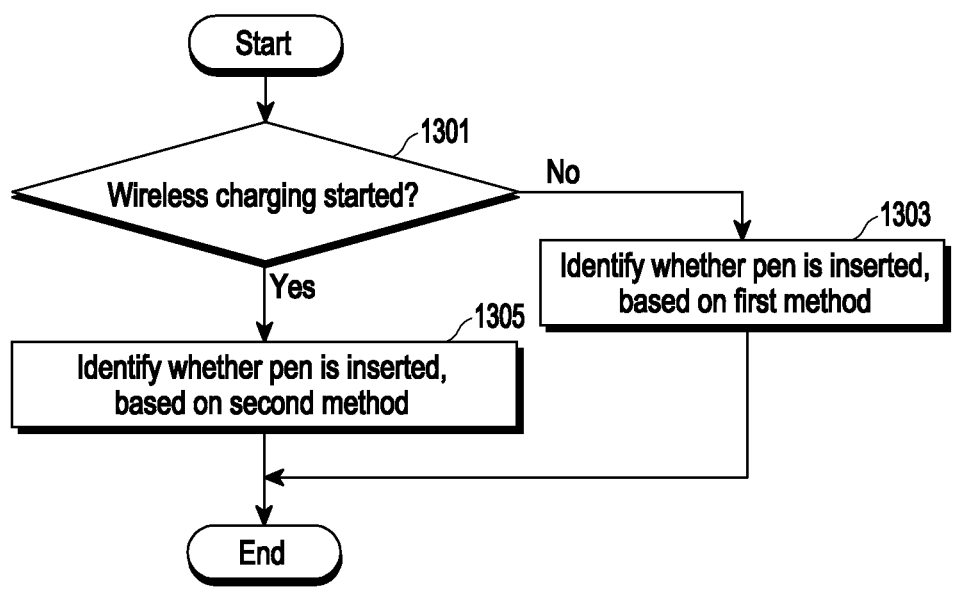
FIG. 13 is a flowchart illustrating an example method of operating an electronic device according to various embodiments.
Figure 14:
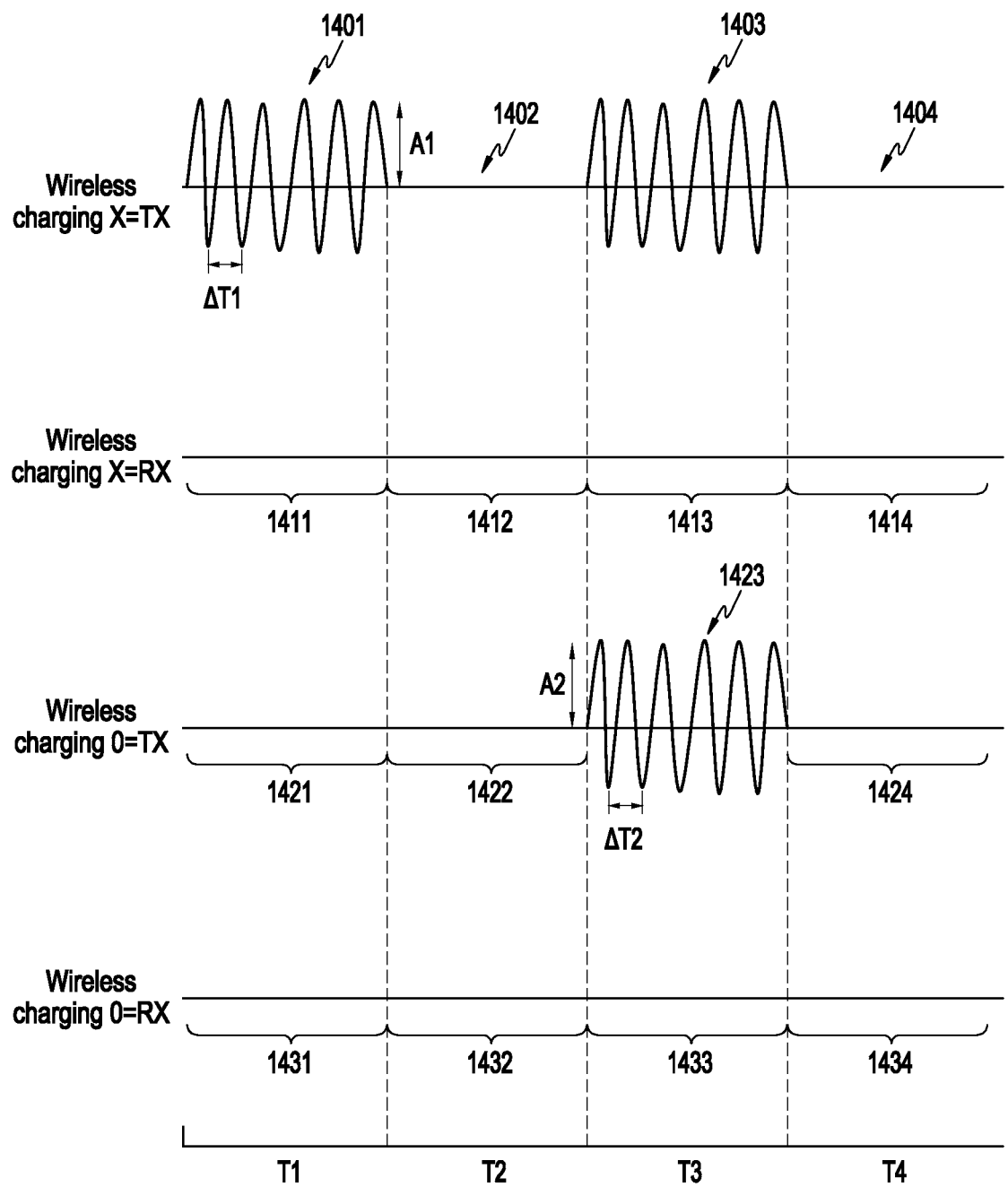
FIG. 14 is a graph illustrating a transmission signal and a received signal during wireless charging/without wireless charging according to various embodiments.

FIG. 13 is a flowchart illustrating an example method of operating an electronic device according to various embodiments. The embodiment of FIG. 13 will be described with reference to FIG. 14. FIG. 14 is a graph illustrating an example transmission signal and an example reception signal for wireless charging during wireless charging/without wireless charging according to various embodiments.

According to various embodiments, the electronic device 101 may identify whether wireless charging has been started in operation 1301. For example, the electronic device 101 may obtain information indicating whether wireless charging is started from the wireless charging module, and identify whether wireless charging has been started based on the obtained information. A method of identifying whether wireless charging has been started is not limited. In addition, the start of wireless charging in the present disclosure may be not only an actual charging start, but also reception of power of a specified magnitude or more in the wireless charging module, for example, reception of power with a voltage at or above a specified level at the output terminal of the rectifier in the wireless charging module.

According to various embodiments, when identifying that wireless charging has not been started (1301—No), the electronic device 101 may identify whether the stylus pen 201 has been inserted in a first method in operation 1303. According to the first method, the electronic device 101 may transmit the first transmission signal 1401 during a first period T1 as illustrated in FIG. 14. The first transmission signal 1401 may have, for example, a first amplitude A1 and a first period ΔT1. In the first method, the electronic device 101 may stop the application of the transmission signal during a second period T2 (1402). The electronic device 101 may stop detection of a reception signal during the first period T1 (1411) and attempt detection of the reception signal during the second period T2 (1412). According to the first method, the electronic device 101 may transmit the second transmission signal 1403 during a third period T3 as illustrated in FIG. 14. In the first method, the electronic device 101 may stop the application of the transmission signal during a fourth period T4 (1404). The electronic device 101 may stop the detection of the reception signal during the third period T3 (1413), and attempt to detect the reception signal during the fourth period T4 (1414). In the first method, the electronic device 101 may identify whether the stylus pen 201 has been inserted during the second period T2 based on the reception signal measured in the second period T2, and identify whether the stylus pen 201 has been inserted during the fourth period T4 based on the reception signal measured in the fourth period T4.

According to various embodiments, when identifying that wireless charging has started (1301—Yes), the electronic device 101 may identify whether the stylus pen 201 has inserted in a second method in operation 1305.

For example, according to the second method, the electronic device 101 may stop the transmission of the transmission signal during the first period T1 (1421), and may stop the transmission of the transmission signal during the second period T2 (1422), as illustrated in FIG. 14. The electronic device 101 may stop the detection of the reception signal during the first period T1 (1431) and detect the reception signal during the second period T2 (1432). During the second period T2, for example, a reception signal corresponding to noise may be detected. During the third period T3, the electronic device 101 may apply a third transmission signal 1423 to the at least one coil 411 and 412. The third transmission signal 1423 may have, for example, a second amplitude A2 and a second period ΔT2. The amplitude (e.g., the second amplitude A2) of the transmission signal according to the second method may be set equal to or different from the amplitude of the transmission signal (e.g., the first amplitude A1) according to the first method. An application period (e.g., the second period ΔT2) of the transmission signal according to the second method may be set to be equal to or different from an application period (e.g., the second period ΔT2) of the transmission signal according to the first method. According to the second method, during the fourth period T4, the electronic device 101 may stop the application of the transmission signal (1424). The electronic device 101 may stop the detection of the reception signal during the third period T3 (1433) and detect the reception signal during the fourth period T4 (1434). During the fourth period T4, a signal based on a resonance signal from the stylus pen 201 and a reception signal mixed with noise may be detected. The electronic device 101 may identify whether the stylus pen 201 has been inserted based on the reception signal sensed during the second period T2 and the reception signal sensed during the fourth period T4. For example, the electronic device 101 may identify whether the stylus pen 201 has been inserted based on a result of subtraction between the reception signal sensed during the second period T2 and the reception signal sensed during the fourth period T4. As described above, the electronic device 101 may additionally perform filtering on the subtraction result.

Meanwhile, according to various embodiments, when a condition different from the wireless charging start is set, the electronic device 101 may identify whether the stylus pen 201 has been inserted according to either of the first method or the second method based on whether the condition has been detected in operation 1303. For example, when the electronic device 101 wirelessly charges another electronic device, the electronic device 101 may identify whether the stylus pen 201 has been inserted according to the second method. Alternatively, upon detection of an environment using a plurality of communication schemes (an MR-DC environment), the electronic device 101 may identify whether the stylus pen 201 has been inserted according to the second method.

According to various embodiments, the electronic device 101 may apply a transmission signal to the at least one coil 411 and 412 during the first period and identify whether the stylus pen 201 has been inserted based on a reception signal measured during the second period, according to the first method. In addition, according to the second method, the electronic device 101 may identify whether the stylus pen 201 has been inserted based on information received from the stylus pen 201 through wireless communication (e.g., BLE communication). The stylus pen 201 may identify whether it is being inserted into the electronic device 101, for example, based on whether the strength of a signal from the at least one coil 411 and 412 of the electronic device 101 is equal to or greater than a specified strength. Alternatively, when the stylus pen 201 receives a signal having a pattern corresponding to insertion in progress and fails in detecting the signal of the corresponding pattern any longer, the stylus pen 201 may identify that it has been withdrawn from the electronic device 101. The stylus pen 201 may transmit information indicating whether it is being inserted to the electronic device 101 through wireless communication (e.g., BLE communication), and the electronic device 101 may identify whether the stylus pen 201 has been inserted, based on the received information. While identifying whether the stylus pen 201 has been inserted through wireless communication, the electronic device 101 may stop applying a transmission signal to the at least one coil 411 and 412 and/or measuring a reception signal. In various embodiments, the stylus pen 201 may transmit information indicating a current state in a communication signal. Alternatively, the stylus pen 201 may adjust at least one parameter (e.g., a connection parameter), when it is withdrawn from the electronic device 101. The electronic device 101 may identify whether the stylus pen 201 has been inserted based on the information included in the communication signal.

Because the second method requires additional scanning, the second method may cause more power consumption of the electronic device 101 than the first method. Accordingly, when wireless charging is started, the electronic device 101 may identify whether the stylus pen 201 has been inserted according to the second method. In an environment in which noise is relatively small (e.g., an environment in which wireless charging is not performed), the electronic device 101 may identify whether the stylus pen 201 has been inserted according to the first method.

According to various embodiments, the stylus pen 201 may be mounted on (or attached to) at least one surface (e.g., the side surface or rear surface) of the electronic device 101. For example, a magnet may be disposed in at least a part of the stylus pen 201, and the stylus pen 201 may be attached to the electronic device 101 by a magnetic force. In this case, the electronic device 101 may identify whether the stylus pen 201 has been attached based on sensing data from a hall sensor. The electronic device 101 may identify whether the stylus pen 201 has been attached based on the sensing data from the hall sensor according to the first method. In a situation where wireless charging is started, the electronic device 101 may identify whether the stylus pen 201 has been attached according to the second method. For example, according to the second method, the electronic device 101 may receive a wireless communication (e.g., BLE communication) signal from the stylus pen 201, and identify whether the stylus pen 201 has been attached, based on information included in the wireless communication signal. For example, the stylus pen 201 may identify whether the stylus pen 201 has been attached based on sensing data from a sensor (e.g., a hall sensor and/or a touch sensor) in the stylus pen 201. When identifying that the stylus pen 201 has been detached from the electronic device 101, the stylus pen 201 may transmit a wireless communication signal including information indicating the detachment to the electronic device 101. According to the second method, the electronic device 101 may identify whether the stylus pen 201 has been attached or detached, based on the information in the received wireless communication signal.

According to various example embodiments, an electronic device (e.g., the electronic device 101) configured to detect a contact by a peripheral device (e.g., the stylus pen 201) may include at least one coil (e.g., the at least one coil 411 and 412) configured to interwork with the peripheral device (e.g., the stylus pen 201), and at least one processor (e.g., the processor 120 or the pen controller 401) configured to detect a contact by the peripheral device (e.g., the stylus pen 201). The at least one processor (e.g., the processor 120 or the pen controller 401) may be configured to: detect a first reception signal from the at least one coil (e.g., the at least one coil 411 and 412) during a first period, control application of a first transmission signal to the at least one coil (e.g., the at least one coil 411 and 412) during a second period based on the first period elapsing, detect a second reception signal from the at least one coil (e.g., the at least one coil 411 and 412) during a third period based on the second period elapsing, and identify whether the peripheral device (e.g., the stylus pen 201) is inserted into the electronic device (e.g., the electronic device 101), based on the first reception signal and the second reception signal. The first reception signal may not generated by the peripheral device (e.g., the stylus pen 201), and the second reception signal may be generated in response to reception of the first transmission signal at the peripheral device (e.g., the stylus pen 201).

According to various example embodiments, the at least one processor (e.g., the processor 120 or the pen controller 401) may be configured to: identify a result of subtraction between the first reception signal and the second reception signal, and identify whether the peripheral device (e.g., the stylus pen 201) is inserted into the electronic device (e.g., the electronic device 101), based on the result of the subtraction.

According to various example embodiments, the at least one processor (e.g., the processor 120 or the pen controller 401) may be configured to: based on the result of the subtraction being equal to or greater than a first threshold, identify that the peripheral device (e.g., the stylus pen 201) is inserted into the electronic device (e.g., the electronic device 101), and based on the result of the subtraction being equal to or less than a second threshold, identify that the peripheral device (e.g., the stylus pen 201) is withdrawn from the electronic device (e.g., the electronic device 101).

According to various example embodiments, the at least one processor (e.g., the processor 120 or the pen controller 401) may be further configured to perform filtering on the result of the subtraction.

According to various example embodiments, wherein the at least one processor (e.g., the processor 120 or the pen controller 401) may be configured to: based on a result of the filtering being equal to or greater than a first threshold, identify that the peripheral device (e.g., the stylus pen 201) is inserted into the electronic device, and based on the result of the filtering being equal to or less than a second threshold, identify that the peripheral device (e.g., the stylus pen 201) is withdrawn from the electronic device (e.g., the electronic device 101).

According to various example embodiments, the at least one processor (e.g., the processor 120 or the pen controller 401) may be configured to: as at least a part of detecting a first reception signal, identify whether the electronic device (e.g., the electronic device 101) starts wireless charging, and based on the wireless charging being started, detect the first reception signal.

According to various example embodiments, the at least one processor (e.g., the processor 120 or the pen controller 401) may be further configured to: apply a second transmission signal to the at least one coil (e.g., the at least one coil 411 and 412) during a fourth period based on identifying that the electronic device (e.g., the electronic device 101) does not perform the wireless charging, detect a third reception signal from the at least one coil (e.g., the at least one coil 411 and 412) during a fifth period based on the fourth period elapsing, and identify whether the peripheral device (e.g., the stylus pen 201) is inserted based on the third reception signal.

According to various example embodiments, an electronic device (e.g., the electronic device 101) configured to detect a contact by a peripheral device (e.g., the stylus pen 201) may include at least one coil (e.g., the at least one coil 411 and 412) configured to interwork with the peripheral device (e.g., the stylus pen 201), and at least one processor (e.g., the processor 120 or the pen controller 401) configured to detect a contact by the peripheral device (e.g., the stylus pen 201). The at least one processor (e.g., the processor 120 or the pen controller 401) may be configured to: identify whether wireless charging is started from a wireless power supply by the electronic device (e.g., the electronic device 101), based on the wireless charging not being started, identify whether the peripheral device (e.g., the stylus pen 201) is inserted into the electronic device (e.g., the electronic device 101), based on a first method, and based on the wireless charging being started, identify whether the peripheral device (e.g., the stylus pen 201) is inserted into the electronic device (e.g., the electronic device 101), based on a second method different from the first method.

According to various example embodiments, the at least one processor (e.g., the processor 120 or the pen controller 401) may be configured to: detect a first reception signal from the at least one coil (e.g., the at least one coil 411 and 412) during a first period, control application of a first transmission signal to the at least one coil (e.g., the at least one coil 411 and 412) during a second period based on the first period elapsing, detect a second reception signal from the at least one coil (e.g., the at least one coil 411 and 412) during a third period based on the second period elapsing, and identify whether the peripheral device (e.g., the stylus pen 201) is inserted into the electronic device (e.g., the electronic device 101), based on the first reception signal and the second reception signal. The first reception signal may not be generated by the peripheral device (e.g., the stylus pen 201), and the second reception signal may be generated in response to reception of the first transmission signal at the peripheral device (e.g., the stylus pen 201).

According to various example embodiments, the at least one processor (e.g., the processor 120 or the pen controller 401) may be configured to: identify a result of subtraction between the first reception signal and the second reception signal, and identify whether the peripheral device (e.g., the stylus pen 201) is inserted into the electronic device (e.g., the electronic device 101), based on the result of the subtraction.

According to various example embodiments, the at least one processor (e.g., the processor 120 or the pen controller 401) may be configured to: based on the result of the subtraction being equal to or greater than a first threshold, identify that the peripheral device (e.g., the stylus pen 201) is inserted into the electronic device (e.g., the electronic device 101), and based on the result of the subtraction being equal to or less than a second threshold, identify that the peripheral device (e.g., the stylus pen 201) is withdrawn from the electronic device (e.g., the electronic device 101).

According to various example embodiments, the at least one processor (e.g., the processor 120 or the pen controller 401) may be further configured to perform filtering on the result of the subtraction.

According to various example embodiments, the at least one processor (e.g., the processor 120 or the pen controller 401) may be configured to: based on a result of the filtering being equal to or greater than a first threshold, identify that the peripheral device (e.g., the stylus pen 201) is inserted into the electronic device (e.g., the electronic device 101), and based on the result of the filtering being equal to or less than a second threshold, identify that the peripheral device (e.g., the stylus pen 201) is withdrawn from the electronic device (e.g., the electronic device 101).

According to various example embodiments, the at least one processor (e.g., the processor 120 or the pen controller 401) may be configured to: apply a second transmission signal to the at least one coil (e.g., the at least one coil 411 and 412) during a fourth period, detect a third reception signal from the at least one coil (e.g., the at least one coil 411 and 412) during a fifth period based on the fourth period elapsing, and identify whether the peripheral device (e.g., the stylus pen 201) is inserted, based on the third reception signal.

According to various example embodiments, an electronic device (e.g., the electronic device 101) configured to detect a contact of a peripheral device (e.g., the stylus pen 201) may include at least one coil (e.g., the at least one coil 411 and 412) configured to interwork with the peripheral device (e.g., the stylus pen 201), and at least one processor (e.g., the processor 120 or the pen controller 401) configured to detect a contact by the peripheral device (e.g., the stylus pen 201). The at least one processor (e.g., the processor 120 or the pen controller 401) may be configured to: control application of a first transmission signal to the at least one coil (e.g., the at least one coil 411 and 412) during a first period, detect a first reception signal from the at least one coil (e.g., the at least one coil 411 and 412) during a second period based on the first period elapsing, detect a second reception signal from the at least one coil (e.g., the at least one coil 411 and 412) during a third period based on the second period elapsing, and identify whether the peripheral device (e.g., the stylus pen 201) is inserted into the electronic device (e.g., the electronic device 101), based on the first reception signal and the second reception signal. The first reception signal may be generated in response to reception of the first transmission signal at the peripheral device (e.g., the stylus pen 201), and the second reception signal may not be generated by the peripheral device (e.g., the stylus pen 201).

According to various example embodiments, the at least one processor (e.g., the processor 120 or the pen controller 401) may be configured to: identify a result of subtraction between the first reception signal and the second reception signal, and identify whether the peripheral device (e.g., the stylus pen 201) is inserted into the electronic device (e.g., the electronic device 101), based on the result of the subtraction.

According to various example embodiments, the at least one processor (e.g., the processor 120 or the pen controller 401) may be configured to: based on the result of the subtraction being equal to or greater than a first threshold, identify that the peripheral device (e.g., the stylus pen 201) is inserted into the electronic device (e.g., the electronic device 101), and based on the result of the subtraction being equal to or less than a second threshold, identify that the peripheral device (e.g., the stylus pen 201) is withdrawn from the electronic device (e.g., the electronic device 101).

According to various example embodiments, the at least one processor (e.g., the processor 120 or the pen controller 401) may further be configured to perform filtering on the result of the subtraction.

According to various example embodiments, the at least one processor (e.g., the processor 120 or the pen controller 401) may be configured to: based on a result of the filtering being equal to or greater than a first threshold, identify that the peripheral device (e.g., the stylus pen 201) is inserted into the electronic device (e.g., the electronic device 101), and based on the result of the filtering being equal to or less than a second threshold, identify that the peripheral device (e.g., the stylus pen 201) is withdrawn from the electronic device (e.g., the electronic device 101).

According to various example embodiments, the at least one processor (e.g., the processor 120 or the pen controller 401) is configured to: identify whether the electronic device (e.g., the electronic device 101) starts wireless charging, and based on the wireless charging being started, apply the first transmission signal, detect the first reception signal, and detect the second reception signal.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with" or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or an external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device configured to detect a contact by a peripheral device, the electronic device comprising:
   at least one coil configured to interwork with the peripheral device, and
   at least one processor configured to detect a contact by the peripheral device and configured to:
   detect a first reception signal from the at least one coil during a first period,
   apply a first transmission signal to the at least one coil during a second period based on the first period elapsing,
   detect a second reception signal from the at least one coil during a third period based on the second period elapsing, and
   identify whether the peripheral device is inserted into the electronic device, based on the first reception signal and the second reception signal, and
   wherein the first reception signal is not generated by the peripheral device, and the second reception signal is to be generated in response to the peripheral device receiving the first transmission signal.

2. The electronic device of claim 1, wherein the at least one processor is configured to:
   identify a result of subtraction between the first reception signal and the second reception signal, and
   identify whether the peripheral device is inserted into the electronic device, based on the result of the subtraction.

3. The electronic device of claim 2, wherein the at least one processor is configured to:
   based on the result of the subtraction being equal to or greater than a first threshold, identify that the peripheral device is inserted into the electronic device, and
   based on the result of the subtraction being equal to or less than a second threshold, identify that the peripheral device is withdrawn from the electronic device.

4. The electronic device of claim 2, wherein the at least one processor is further configured to:
   perform filtering based on the result of the subtraction.

5. The electronic device of claim 4, wherein the at least one processor is configured to:
   based on a result of the filtering being equal to or greater than a first threshold, identify that the peripheral device is inserted into the electronic device, and
   based on the result of the filtering being equal to or less than a second threshold, identify that the peripheral device is withdrawn from the electronic device.

6. The electronic device of claim 1, wherein the at least one processor is configured to:

identify whether the electronic device starts wireless charging, and based on the wireless charging being started, detect the first reception signal.

7. The electronic device of claim 6, wherein the at least one processor is configured to:

apply a second transmission signal to the at least one coil during a fourth period based on identifying that the electronic device does not perform the wireless charging, detect a third reception signal from the at least one coil during a fifth period based on the fourth period elapsing, and identify whether the peripheral device is inserted based on the third reception signal.

8. An electronic device configured to detect a contact of a peripheral device, the electronic device comprising:

at least one coil configured to interwork with the peripheral device, and at least one processor configured to detect a contact by the peripheral device and configured to:

apply a first transmission signal to the at least one coil during a first period, detect a first reception signal from the at least one coil during a second period based on the first period elapsing, detect a second reception signal from the at least one coil during a third period based on the second period elapsing, and identify whether the peripheral device is inserted into the electronic device, based on the first reception signal and the second reception signal, and wherein the first reception signal is to be generated in response to the peripheral device receiving the first transmission signal, and the second reception signal not being generated by the peripheral device.

9. The electronic device of claim 8, wherein the at least one processor is configured to:

identify a result of subtraction between the first reception signal and the second reception signal, and identify whether the peripheral device is inserted into the electronic device, based on the result of the subtraction.

10. The electronic device of claim 9, wherein the at least one processor is configured to:

based on the result of the subtraction being equal to or greater than a first threshold, identify that the peripheral device is inserted into the electronic device, and based on the result of the subtraction being equal to or less than a second threshold, identify that the peripheral device is withdrawn from the electronic device.

11. The electronic device of claim 9, wherein the at least one processor is configured to perform filtering based on the result of the subtraction.

12. The electronic device of claim 11, wherein the at least one processor is configured to: based on a result of the filtering being equal to or greater than a first threshold, identify that the peripheral device is inserted into the electronic device, and based on the result of the filtering being equal to or less than a second threshold, identify that the peripheral device is withdrawn from the electronic device.

13. The electronic device of claim 8, wherein the at least one processor is configured to:

identify whether the electronic device starts wireless charging, and based on the wireless charging being started, apply the first transmission signal, detect the first reception signal, and detect the second reception signal.

* * * * *